United States Patent [19]

Shimada et al.

[11] Patent Number: 5,278,946

[45] Date of Patent: Jan. 11, 1994

[54] METHOD OF PRESENTING MULTIMEDIA DATA IN A DESIRED FORM BY COMPARING AND REPLACING A USER TEMPLATE MODEL WITH ANALOGOUS PORTIONS OF A SYSTEM

[75] Inventors: Shigeru Shimada, Kodaira; Hitoshi Matsushima, Tachikawa; Seiji Kashioka, Hachioji, all of Japan; Akiko Sugihara, Salt Lake City, Utah

[73] Assignee: Hitachi, Ltd., Tokyo, Japan

[21] Appl. No.: 619,506

[22] Filed: Nov. 29, 1990

[30] Foreign Application Priority Data

Dec. 4, 1989 [JP] Japan .................................. 1-313305
May 28, 1990 [JP] Japan .................................. 2-135193

[51] Int. Cl.$^5$ ............................................. G06F 7/00
[52] U.S. Cl. ..................................... 395/62; 395/600; 395/700; 395/60; 395/66; 364/283.2; 364/DIG. 1
[58] Field of Search ..................... 395/155, 62, 60, 66, 395/153, 154, 156, 157, 158, 159, 160, 161; 364/491, 401; 382/30, 16, 48

[56] References Cited

U.S. PATENT DOCUMENTS

| | | | |
|---|---|---|---|
| 4,800,510 | 1/1989 | Vinberg et al. | 364/518 |
| 5,031,111 | 7/1991 | Chao et al. | 364/488 |
| 5,133,052 | 7/1992 | Bier et al. | 395/155 |

OTHER PUBLICATIONS

Korth et al., *Database System Concepts*, 1986, pp. 466-468.
Pixel, No. 18, "New Approach to Regional Plans and Facility Management-Map Information Processing WING", Kasahaya and Tsuruya.
38th Meeting of National Conference of Information Acadamy, Paper 4R-7, "Realization of Rough Sketch Generating Function in Map Information System", Niwa et al.
Computer Science Investigation Report, No. 6, "Semantic Summarizing Function in Map Database", Kyushu University Large-Size Computer Center.
3rd Meeting of National Conference of Information Academy, "Figure Managing System by Optimal Cell Method", Shimada and Kurata.

*Primary Examiner*—Thomas C. Lee
*Assistant Examiner*—Burch Harper
*Attorney, Agent, or Firm*—Fay, Sharpe, Beall, Fagan, Minnich & McKee

[57] ABSTRACT

Multimedia data in an object structure include entity objects and relation objects, wherein each entity object has data representing a media element as internal data, and each relation object represents a relation between the entity objects. A relation object is searched according to information specified by a search command, and a searched relation object and internal data of an entity object related thereto are displayed on the screen of a display unit as a set of display elements. To generate a digest of the multimedia data, a matching between a structure portion of a user model and a structure portion of a system model is examined. The user model is generated according to a request of the user and arranged in layers, while the system model has been previously generated. The multimedia data are arranged in layers according to the importance of respective data elements constituting the multimedia data. According to an examination result, a user model structure portion is selectively replaced by a system model structure portion, and the replaced user model is adjusted so as to display the same.

10 Claims, 26 Drawing Sheets

FIG. 3B

```
= CLASS NAME : SUPERCLASS NAME
    STRUCTURE
    DESCRIPTOR        : STRUCTURED CLASS NAME

DATA DECLARATIVE
    STATEMENT         : {DATA DECLARATION}

+   CLASS METHOD
    IDENTIFIER        : {CLASS METHOD}

−   INSTANCE METHOD
    IDENTIFIER        : {INSTANCE METHOD}
```

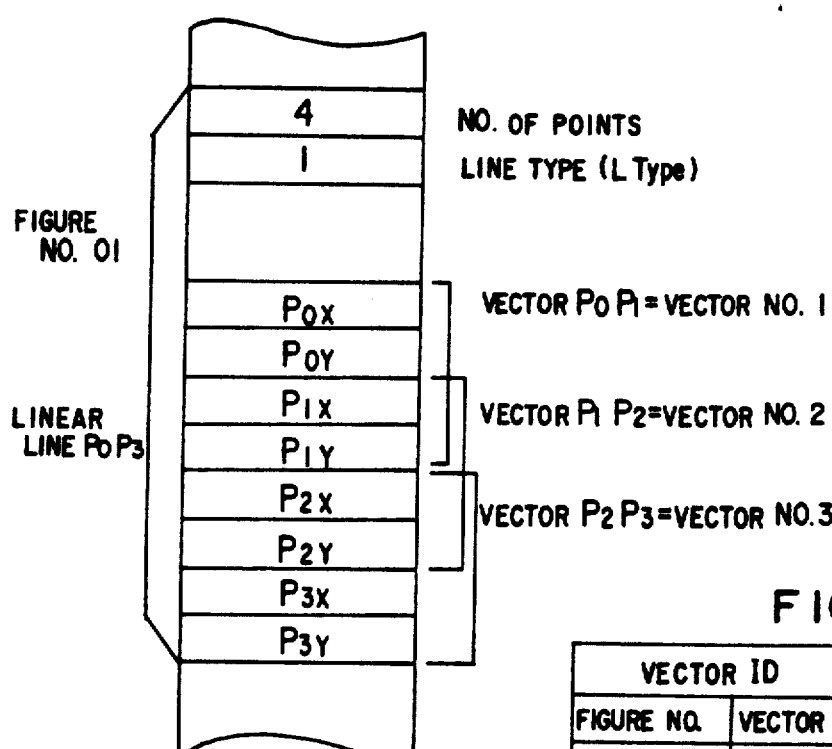

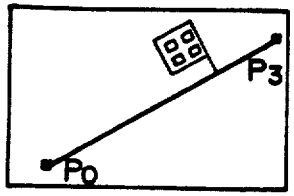
FIG. 12A
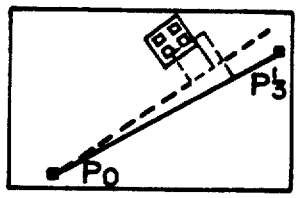
FIG. 12B
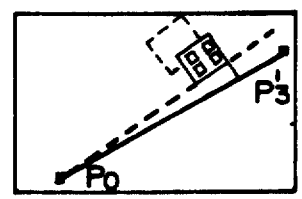
FIG. 12C
FIG. 13
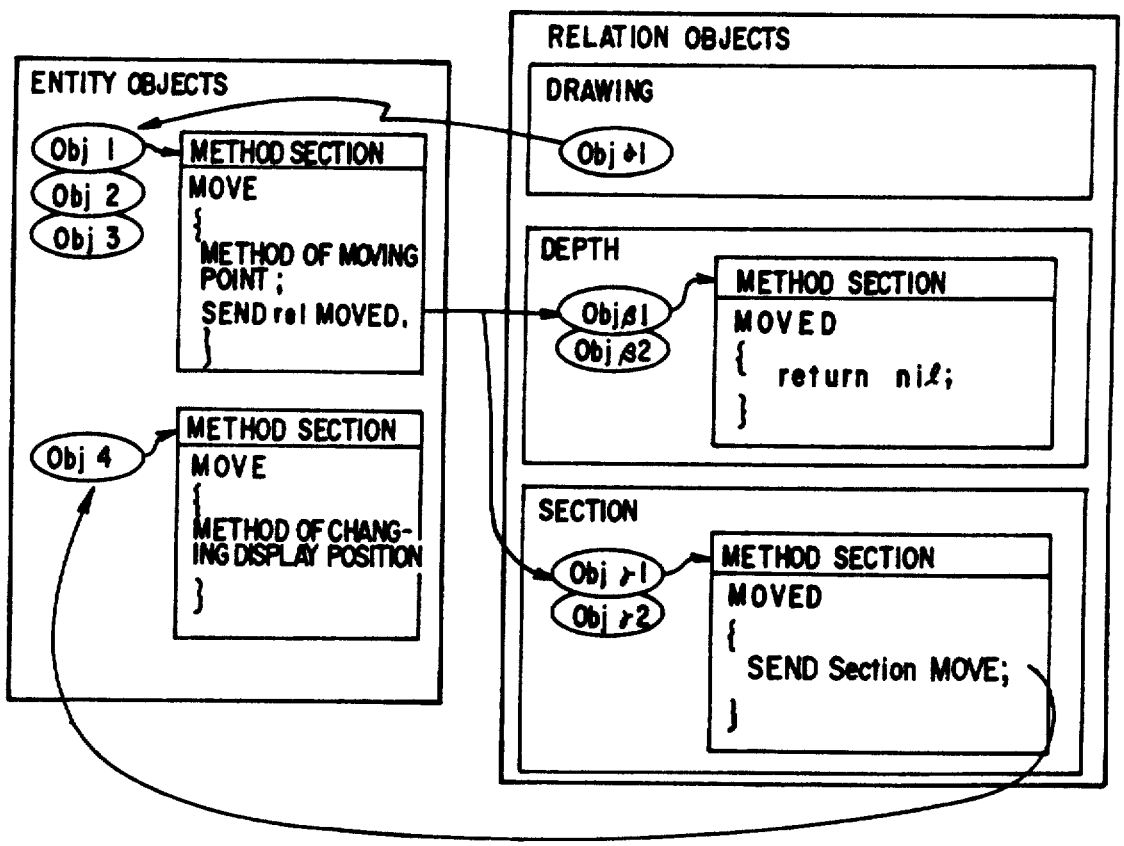

METHOD OF PRESENTING MULTIMEDIA DATA IN A DESIRED FORM BY COMPARING AND REPLACING A USER TEMPLATE MODEL WITH ANALOGOUS PORTIONS OF A SYSTEM

BACKGROUND OF THE INVENTION

1. Field of the Invention

The present invention relates to a method for processing multimedia data in a multimedia database and a system therefor, and more particularly, to a method of searching and editing multimedia data and data related thereto and a system therefor.

2. Description of the Related Art

Large enterprises and self-governing communities having large-scale facilities such as electric power, gas and water maintain a great number of drawings illustrating these facilities. Maps and drawings managed in the form of paper have been accumulated in databases multimedia database by computers with capabilities in CAD techniques or multimedia processing techniques. Techniques on map/drawing information processing systems and CAD systems have been directed to investigate how multimedia data are efficiently inputted to the database and how such data are consistently managed.

However, prior art techniques are not appropriate for the case where a large number of figure data such as maps and drawings are to be managed. FIG. 8 is an example of a drawing illustrating a facility possessed by an enterprise or a self-governing community which manages large-scale facilities. A prior art technique will be explained based on this drawing.

One of the features of drawings and maps is that objects actually having a three-dimensional shape are expressed on a two-dimensional plane. For thus expressing three-dimensional information by two-dimensional information, attribute value data, for example, a depth or height, or the number of floors for a building or the like in a midtown area may be often used. A facility managed in the drawing of FIG. 8 may actually have a three-dimensional shape as shown in FIG. 9.

In FIG. 8, a fat line extending from left to right represents an underground cable line managed by an electric power company, while a line extending vertically a sewer pipe line managed by a waterworks company. A combination of a rectangle and a circle positioned on the left side of FIG. 8 represents a manhole for managing connection between the cable line portions. Numerals 10 and 20 are attribute value data of two portions of the cable line, which represent buried positions of the respective portions.

A combination of a rectangle and a plurality of smaller rectangles is data showing a sectional structure of the cable line. The cable line is typically composed of a bundle of electrical wires, and the sectional structure shows a method of forming the bundle. Generally, such sectional structure is managed in detail by a separate document. For example, each smaller section may be numbered so as to manage connection between the electrical wires on the both sides of the manhole. Thin lines are used to show data such as a sectional structure and depth (10 m, 20 m) at a variety of positions in correspondence to the cable line, whereby a buried state is readily verified by view. Middle lines other than those mentioned above represent roads in a similar manner to ordinary maps.

Drawings as mentioned above are managed, for example, by a drawing information processing system, so that shape, depth and section data are generated from the map representing each building or the like, as shown in FIG. 1. For simplicity, the prior art will be explained, with reference to FIG. 1, solely regarding the cable line in FIG. 8. A left part of FIG. 1 indicates display elements on the screen, while a right part of the same indicates objects corresponding to the respective display elements. For example, since the cable line in FIG. 8 is related with two kinds of data, i.e., a depth and a cross-sectional structure, there are required a drawing class, a depth class and a section class.

Since internal data of an object in the drawing class, i.e., a drawing object represent the cable line, data indicative of a line $\overline{P_0P_3}$, the coordinates of the points of which are $P_0$ and $P_3$, respectively, is registered in an internal data section of the drawing object. In an internal data section of an object in the section class, i.e., a section object, there are registered data representing a line $\overline{P_0P_1}$ or $\overline{P_1P_3}$ obtained by dividing the line $\overline{P_0P_3}$ at a changing point of the sectional structure and data representing a sectional structure. In an internal data section of an object in the depth class, i.e., a depth object, there are registered data representing a line $\overline{P_0P_2}$ or $\overline{P_2P_3}$ obtained by dividing the line $P_0P_3$ at a changing point and data 10 m or 20 m representing attribute values of the depths.

Methods for managing internal data such as those lines are also described in a method section for every object. A method for the drawing object includes a first method of managing (e.g. deletion, display and so on) internal data of the drawing object and second and third methods for managing internal data of other classes by an operation in the drawing object. The second method is a method of managing relation with the section objects and the third method is a method of managing relation with the depth objects. An example of handling internal data of an object in another class by operation results on the internal data of the drawing object may be movement of the cable line. This is because, when a sectional structure of the cable line is given by image data, it is necessary to modify a displayed position of the image data due to the movement of the cable line.

A drawing information processing system requires a search operation and an editing operation, and required editing functions are roughly divided into the following two:

(A1) A different class data modifying function, and
(A2) A drawing data modifying function Further, the different class data modifying function (A1) requires a function for modifying internal data of another object and a function for modifying a range related to the internal data of another object.

To achieve the search function and the editing function as mentioned above, it is necessary to display:

(B1) A value of internal data of an object specified by a selected point, and
(B2) A range of the same internal data value, when the internal data are to be displayed upon search of the internal data or in the middle of editing the internal data. For visually indicating a range of the same internal data value to the user, generally a figure corresponding to the range is superimposed on a searched map or drawing and marked thereon. Such a figure for marking is not necessary when the searched original map or drawing is displayed. The number of figures necessary for marking in the course of a property data search operation depends on the number of related property data.

Conventionally, the marking technique has been achieved by providing a class for each of properties such as depth and section and registering figures for marking in every class, as shown in FIG. 1. In other words, the same figures for marking have been registered for each of a plurality of properties. For example, even if the shape is a line, the same figures are registered in the classes corresponding to the depth and section properties in the prior art example explained above. Therefore, when a depth object is to be modified, the internal data of the depth object are not registered as a line but as two lines divided at a changing point of the depth property data.

In the case where image data are managed by the section class as in the above-mentioned example, when a line cable movement operation is to be executed, it is necessary to propagate this operation to the other classes. In this case, a method for the above-mentioned operation is described in a method for managing a relation with the section class in the drawing class. Such prior art is shown, for example, by Reference 1, "New Approach to Regional Plans and Facility Management—Map Information Processing System WING" by Kasahaya and Tsuruya in a reference "PIXEL No. 18".

In a conventional system as mentioned above, since a single figure is registered in different classes, if data on a figure are modified, it is necessary to modify the same figure data registered in all of the other classes. An example of the class where a large number of modifications are needed for the same figure data may be a processing of simultaneously displaying separately managed maps showing adjacent regions. In this case, it is necessary to modify a coordinate system of respective maps for merging maps in different coordinate systems to a common coordinate system. With a conventional method of registering a single figure in respective classes, the merge operation is needed for the figure registered in the respective classes, incurring a problem that a huge amount of operations are required.

Also, the above-mentioned prior art has a large number of classes related to a single figure and hence is not appropriate to a system in which new classes need to be related to the figure after the system has been built. Specifically, relations with other classes are managed by the respective classes, so that if data in a class are to be deleted or added, corresponding modifications are required to related methods in the other classes.

When these map or drawing data are registered in a database of a drawing information processing system or a CAD system, it is desirable to utilize the database not only as a special database for expert sections but also as a general database for ordinary sections such as a planning section. For this purpose, it is often required to extract only the essence from the map or drawing data, conceal unnecessary detailed information and emphasize the essence. With this respect, conventionally, necessary data for the essence are determined and extracted from a search result by a person, and an explanation is given to a requester for better understanding. Thus, it is the same as a conventional information offer by way of paper, and no advantage has been obtained from an electrically systematic management of map and drawing information. Also, the prior art has not been intended to provide a digest function which is adapted to extract only necessary data from complicated and detailed map or drawing data and display the extracted information with an emphasis in accordance with importance thereof.

However, there are several examples of investigating a semantic digest function for map or drawing information, mainly led by the universities, as published in Reference 2, "Realization of Rough Sketch Generating Function in Map Information System" by Niwa et al. in Papers 4R-7 for the 38th Meeting of National Conference of Information Academy, and Reference 3, "Semantic Summarizing Function in Map Database" in Computer Science Investigation Report No. 6, pp. 1–10 by Kyushu University Large-size Computer Center.

For example, Reference 2 discloses a method of generating a rough sketch from a departure point to a destination. In other methods, a navigational route is found from a whole map by a navigational searching algorithm, and a rough sketch is generated by investigating intersections along respective roads, with the navigation as the center, and adding roads from the intersections to the adjacent intersections, or roads in a town block including the navigation, and facilities and place names from the respective intersections.

On the other hand, Reference 3 proposes a control for automatically thinning out landform, shoreline and display characters so as to conform to a display scale and prevent superimposed characters when a rough sketch is generated from a map database having map or drawing data including a detailed landform, shoreline, display characters and so on.

However, in the method shown by the above-mentioned Reference 2, it is supposed that coordinate data indicative of a road and a shape of a building, symbols representing a shrine, a bank and so on and texts for display are uniformly described. Therefore, for generating a rough map, it is necessary to perform an navigation searching operation and a search operation within a near range for all elements of map or drawing data in the database. For this reason, it takes a long time to generate a rough map. Also, a rough map generated by this system is merely a rough sketch which principally shows roads in the same scale, wherein neither important elements or media are shown in detail, nor remaining elements are summarized according to importance.

The method of Reference 3 also supposes that map data are uniformly stored in the database. It is therefore necessary to repeatedly execute a geometric operation for automatically thinning out detailed data according to a scale and a lay-out operation for optimally positioning a map without superimposing displayed characters each time a rough map is generated. Thus, as a database is larger, an operating time therefore becomes extremely long. Further, a rough sketch generated by this method is a mere thinned-out sketch having the same scale wherein neither important shapes are shown in detail, nor the remaining parts are summarized according to importance.

Thus, the prior art implies operational problems caused by a difference in the semantic structure of the respective media for automatically generating a rough map or a guiding map. For example, a multimedia database structure for a drawing information processing system shows a semantic structure of a map generally drawn on a scale of 1/25000 which is not adapted for a semantic structure of a guiding map. Therefore, a variety of special media processing programs are required for merging maps showing necessary adjacent regions, changing a scale and so on to adapt for a media structure for a guiding map. Generally, a semantic structure of media (hereinafter simply called "the user model") requested by the user as an object to be processed is often different from a semantic structure of existing multimedia databases, and therefore if such difference is dealt with special programs, it will be required to develop a huge number of application programs.

SUMMARY OF THE INVENTION

The present invention has been made in view of the above-mentioned problems, and its object is to provide a method of processing multimedia data which is capable of readily modifying contents of the multimedia data.

It is another object of the present invention to provide a method of processing multimedia data which is capable of minimally reducing modifications in methods of other classes when data in a class is edited.

It is a further object of the present invention to provide a method of processing multimedia data which permits a user, who does not know an internal structure of a multimedia database, to access the multimedia database from a variety of different viewpoints.

It is a yet further object of the present invention to provide a method of processing multimedia data which is capable of displaying selected data in a multimedia database and a range related therewith.

It is also an object of the present invention to provide a method of processing multimedia data which is capable of generating a rough sketch in which important media are shown in detail and the remaining media are summarized according to importance thereof.

It is a further object of the present invention to provide a method of processing multimedia data which is capable of reducing a time necessary to generate a rough sketch.

It is a further object of the present invention to provide a method of processing multimedia data which is capable of utilizing existing multimedia databases without the necessity of developing a huge number of special programs.

It is yet another object of the present invention to provide a method of processing multimedia data by the use of a semantic model extremely close to a semantic structure arbitrarily designated by a user by an inference matching operation between a user model and a system model, to thereby improve a user interface.

It is also an object of the present invention to provide a system for processing multimedia data for fulfilling any one of the foregoing methods of processing multimedia data.

To achieve the above objects, the present invention provides the following functions:

Media information is classified into classes for describing media data such as figure data and image data, i.e., an entity class and a relation class for describing relation data indicative of relation between data managed by the entity class in such a manner that the media information can be effectively managed.

Also, when a search or editing operation is executed by a request of the user, a necessary relation class, for example, a drawing class, a depth class or a section class in the relation class are selected through a specified menu or the like, and media data are accessed through relation data and a method described in the selected relation class. Thus, this technique can modify entity objects related to the relation class.

Conventionally, a method for an operation which may influence other classes and methods for managing the other classes have been described in a method section of an object. However, in the present invention, since a method for an operation which may influence other entity objects and a method for managing entity objects relating to a relation object which corresponds to property data, are described in a method section of the relation object. Therefore, it is possible to readily add new property data to a database.

According to the present invention, in a facility drawing managing system for handling drawings for maintaining and managing facilities, property data related to two-dimensional coordinate data which represents figure data and a range relating to the property data can be visually displayed.

Conventionally, for displaying the relating range it has been necessary to describe such figure data in a plurality of objects. However, in the present invention, definition of the coordinate data is required only once. Therefore easy correction of media information can be performed.

In addition, for searching for or editing property data, a set of necessary data can be extracted from a database and a range in which the same property is related can be displayed merely by specifying an object defining relation of the property data to entity data or media data.

Further, since a method is described in one object in every relation class or every entity class, it is possible to define a particular method for the relation.

Since media data such as figure data and relation data are always managed it is possible to readily modify contents of processing in accordance with a request from a user.

Visualization of the relation data can provide the user with not only property data but also a range in which the value is related as the contents of the database, thereby making it possible to search for and edit the contents of the database by an easy operation.

When it is necessary to modify property data managed by a relation class, figure data are changed in are entity class, whereby even if figure data are newly generated, the same figure data as before a division can be inherited in the relation class.

The present invention has adapted a structural description for objects or a description in a layer structure such as "is-a" and "part-of" and a description in a parallel-related structure having the same property as rel(-prop), whereby a semantic structure of multimedia managed by a system can be defined as a system model. In addition, a semantic structure of the multimedia requested by the user as the result of an operation such as a search and editing operation can be defined as a user model by a structure description of these objects.

It is also possible to find the structure portion most analogous to a user model as a matching candidate and extract the same from this system model. Also, by correcting and synthesizing these candidates without structural contradictions, it is possible to proximally embody the user model, whereby a discrepancy in the semantic structure between the system model and the user model can be dissolved.

A semantic structure of an object derived as the result of an operation such as a search and editing operation performed by the user is also described in a layer structure and a relational structure as a user model. The matching candidate most analogous to the user model is found by totally evaluating analogies of the respective structures, and the found candidate is corrected and synthesized without producing structural contradictions. As a result, the user model can be approached by using the system model, to thereby dissolve a discrepancy in the semantic structure between the user model and the system model.

Thus, it is possible to automatically generate multimedia having a semantic structure analogous to an arbitrary semantic structure specified by the user from a semantic structure of a multimedia database previously stored as a system model, which results in making needless most of a huge cost necessary to develop application programs for coping with users requests and largely improving the ability as a multimedia processing system.

BRIEF DESCRIPTION OF THE DRAWINGS

FIG. 3B is a diagram showing an expression format for each semantic structure of a user model;

FIGS. 5A to 5C are diagrams showing a data format of figure data, image data related thereto and numeral data on a file, wherein FIG. 5A shows a figure data table which is a format of diagram data on a file, FIG. 5B shows an image data table for managing a relation with the data image and FIG. 5C shows a numeral data table for managing a relation with the numeral data;

FIGS. 10A and 10B are diagrams respectively showing an example of display on a screen in a system using the facility drawing of FIG. 8, wherein FIG. 10A is a diagram showing an example of searching for a cable line in a shape editing operation, and FIG. 10B is a diagram showing an example of a section search operation;

FIGS. 12A to 12C are diagrams respectively showing an example of a display for a drawing editing operation;

FIG. 13 is a diagram showing an example of processing an automatic processing propagating mechanism;

DESCRIPTION OF THE PREFERRED EMBODIMENT

A multimedia data processing system according to the present invention will hereinafter be explained in detail with reference to the accompanying drawings, taking a drawing processing system as an example.

Figure 1:
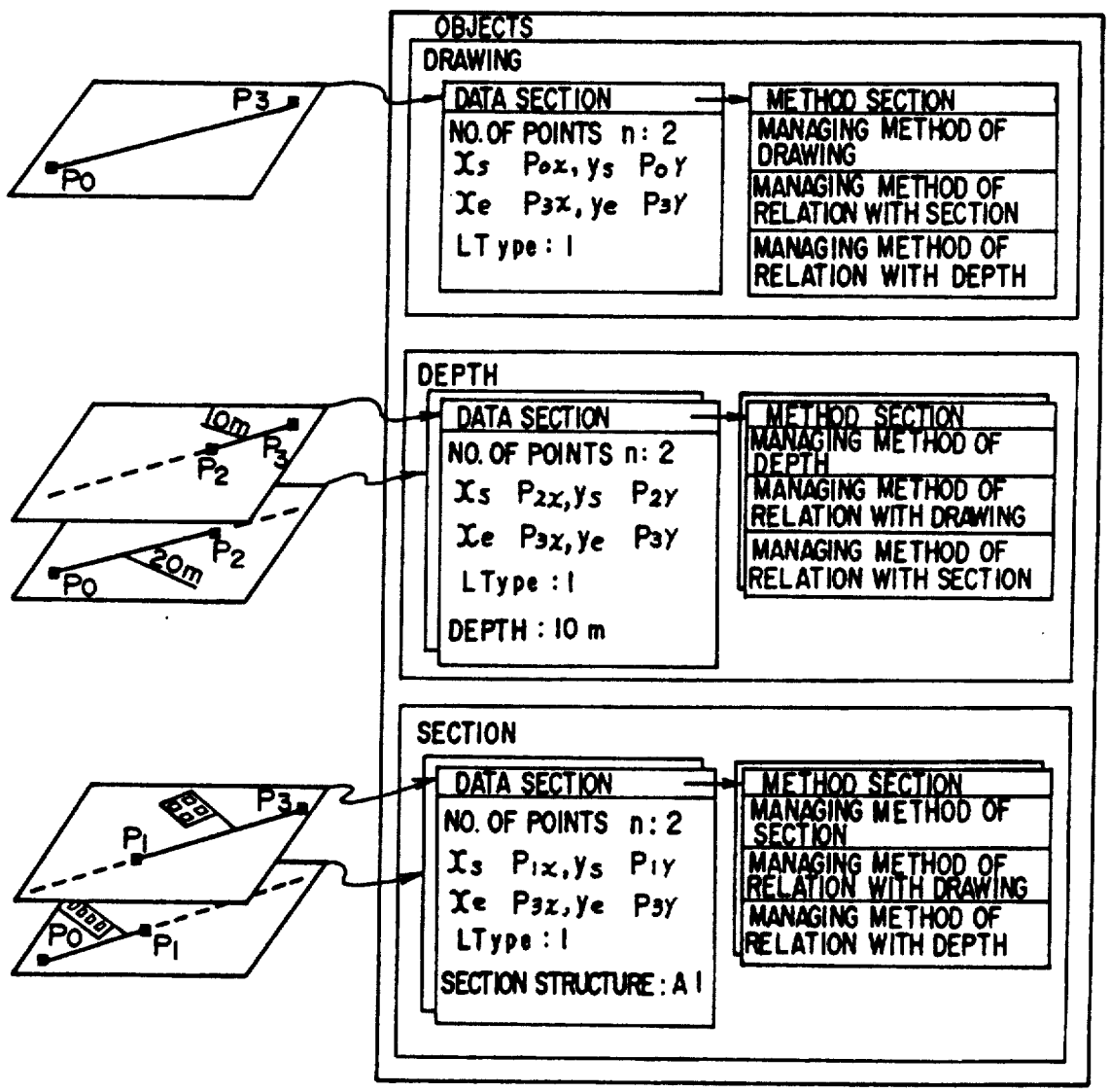
FIG. 1 is a diagram showing the principle of a prior art method.
Figure 2:
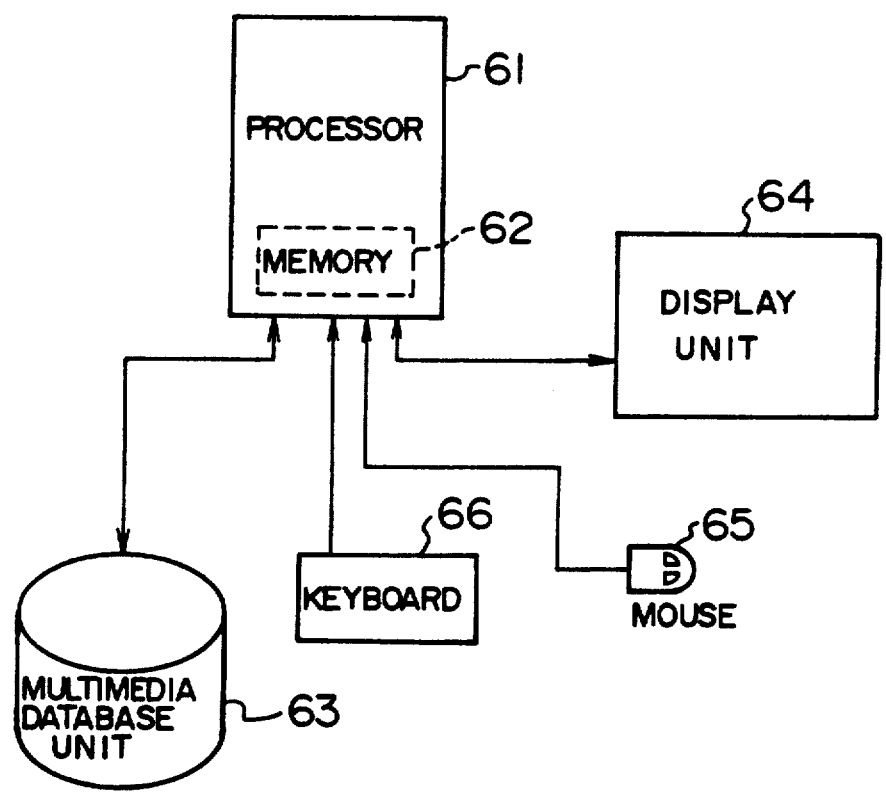
FIG. 2 is a block diagram showing a basic structure of a drawing processing system according to the present invention.

First, a basic structure of a drawing processing system will be explained with reference to FIG. 2. Reference numeral 61 in FIG. 2 designates a processor including a microprocessor or a CPU used in a minicomputer or the like, 62 a memory for temporarily storing data read from a multimedia database unit 63 and data in course of processing, 64 a display unit such as a CRT for displaying figure data, image data or the like to be processed on the screen, 65 a coordinate input unit such as a mouse for pointing to a position on the screen, and 66 a keyboard for inputting data or a command.

Now, a method of describing an object, as will be used in the following explanation, will be explained before a detailed description of the embodiments. The object is characterized in that it is constructed by structured data as general conception and a group of methods for processing the structured data, and that processing is performed based on a message communication and an inter-class inheritance, as represented by Smalltalk-80 described in a document "Small Talk 80" published by Addison Wesley Pub. in 1986. As an object describing method, a variety of expressing methods have existed including the above-mentioned Small-talk-80. In the present invention, there is employed a describing method based on a document "Object-C Manual" published by Step Stone Pub. In detail, as shown in FIG. 3B, the contents of a class name, a structure descriptor, a data declarative statement, a class method identifier and an instance method identifier are described. Particularly, as the class structure descriptors, the present invention employs "is-a" indicative of an abstracted layer structure, "part-of" indicative of a part layer structure, and "relation" indicative of a property relation.

Among the structure descriptors, the "is-a" layer structure provides a layer structure depending on the kind of data which is abstracted to an object, and methods, data declaration and so on can be inherited from a lower class such as a figure class, to an upper class such as an entity class. The "part-of" layer structure provides a layer structure of parts constituting each class, and a given message can be propagated from an upper class to a lower class. The relation layer structure provides properties indicative of relations among a set of entity objects, wherein each entity object can be modified under restriction determined by the relation.

An example of describing a semantic structure of a map will hereinafter be explained by using the above-mentioned example of describing the object structure with reference to FIGS. 3A and 3C.

Figure 3A:
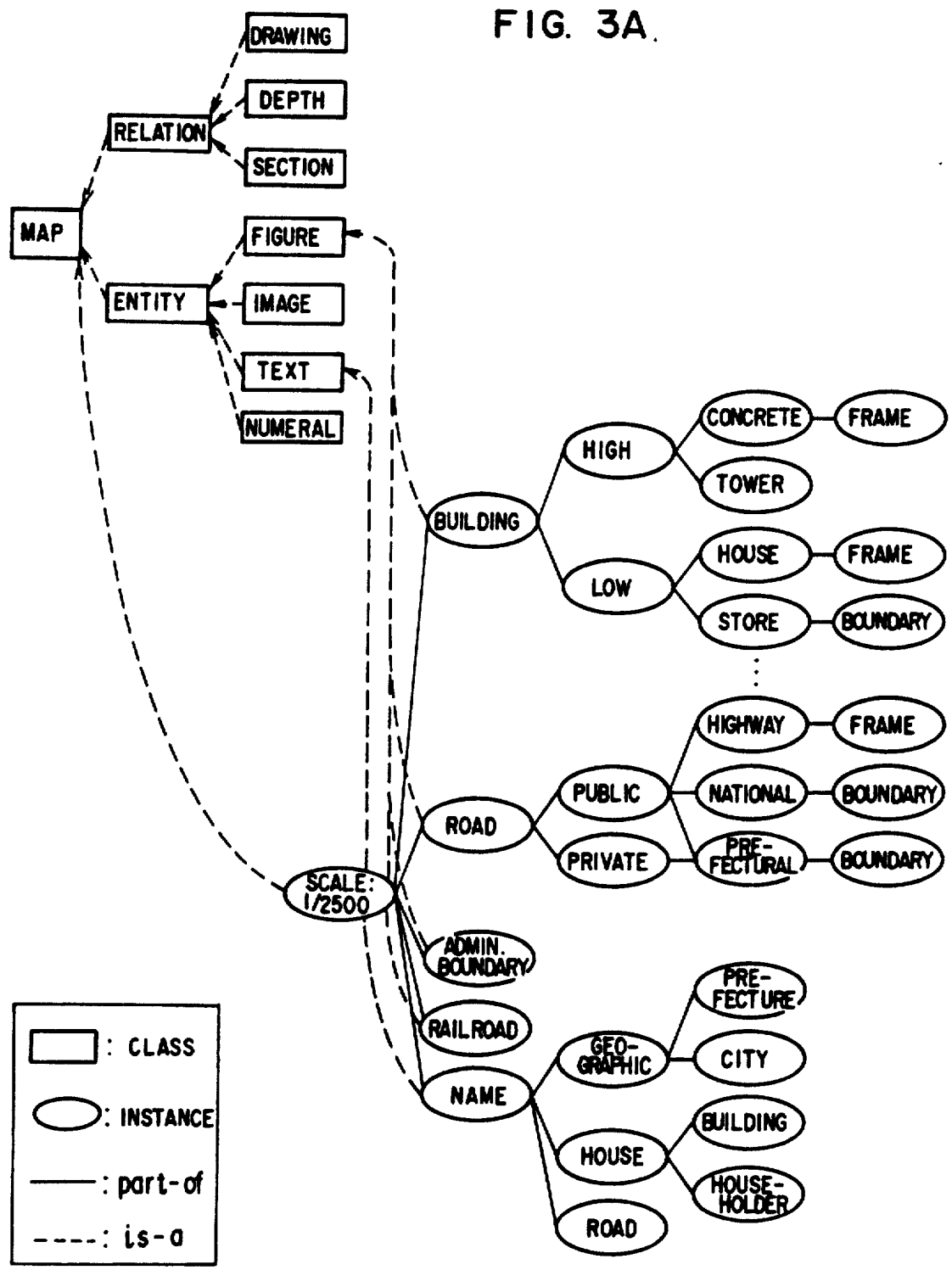
FIG. 3A is a diagram showing a semantic structure of a residence map.
Figure 3C:
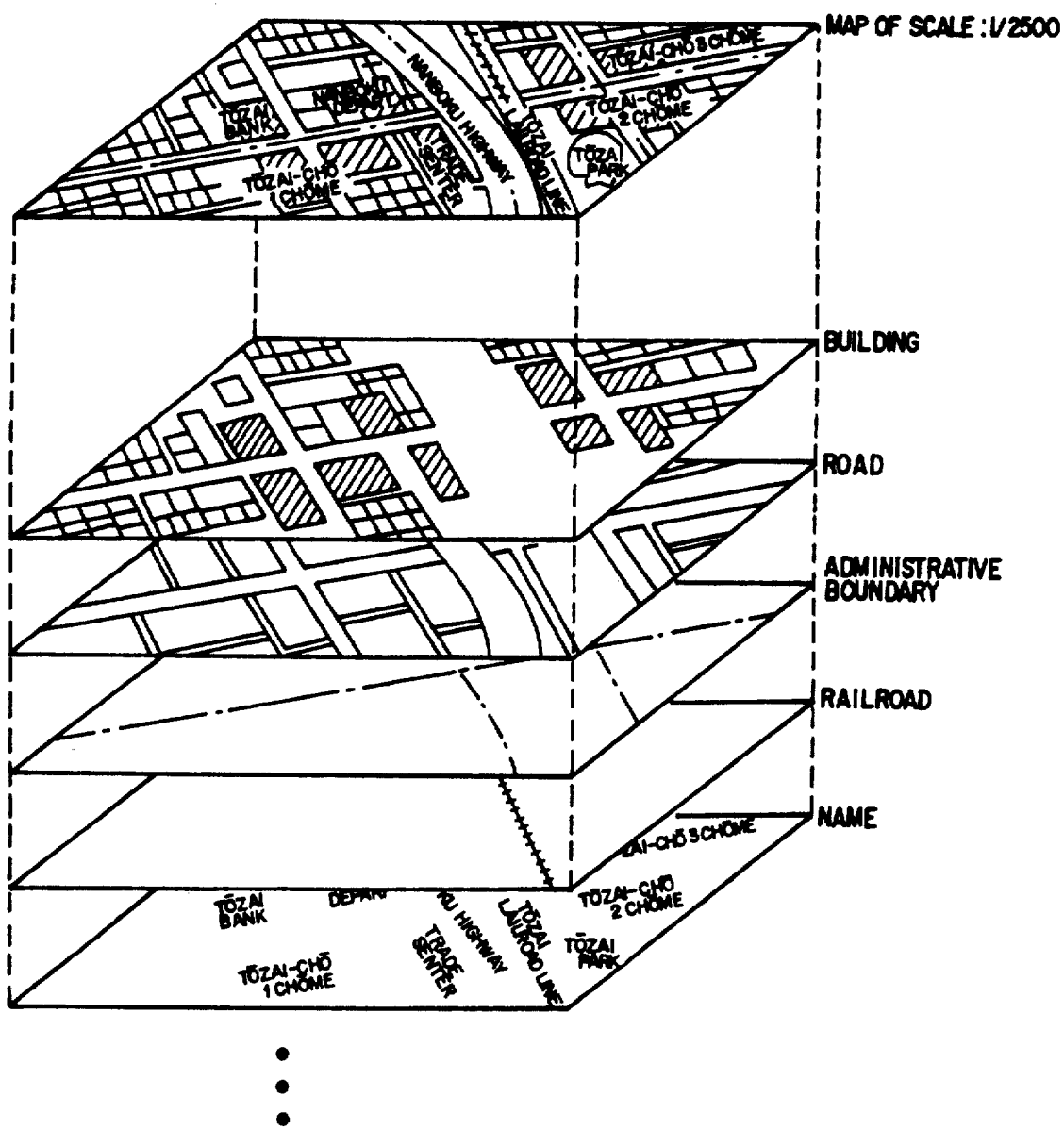
FIG. 3C is a diagram showing that a display element of a residence map has a class-type structure.

In the drawing processing system, data of maps such as residence maps and topographical maps are typically managed by classifying into groups of respective analogous subjects such as a building, a road line, a name and so on, as shown in FIG. 3C. For example, a semantic structure of a map on a scale of 1/2500 is as shown in FIG. 3A. Specifically, a layer of the "part-of" layer structure of this 1/2500 map includes instances such as a "building", a "road", an "administrative boundary", a "railroad" and a "name". A next lower layer of the "part-of" layer structure includes "high" and "low" instances in the case of the "building" instance and a "public" and "private" instances in the case of the "road" instance. The relation class includes lower classes such as a "drawing" class, a "depth" class, a "section" class and so on and a portion of the "is-a" layer structure is constructed by these classes. The entity class includes lower classes such as a "figure" class, an "image" class, a "text" class, a "numeral" class and so on. Further, instances such as the aforementioned "building" and "road" as display elements in these classes are arranged to construct the "is-a" layer structure. This semantic structure is previously stored in a multimedia database as a system model of the drawing processing system.

Figure 4A:
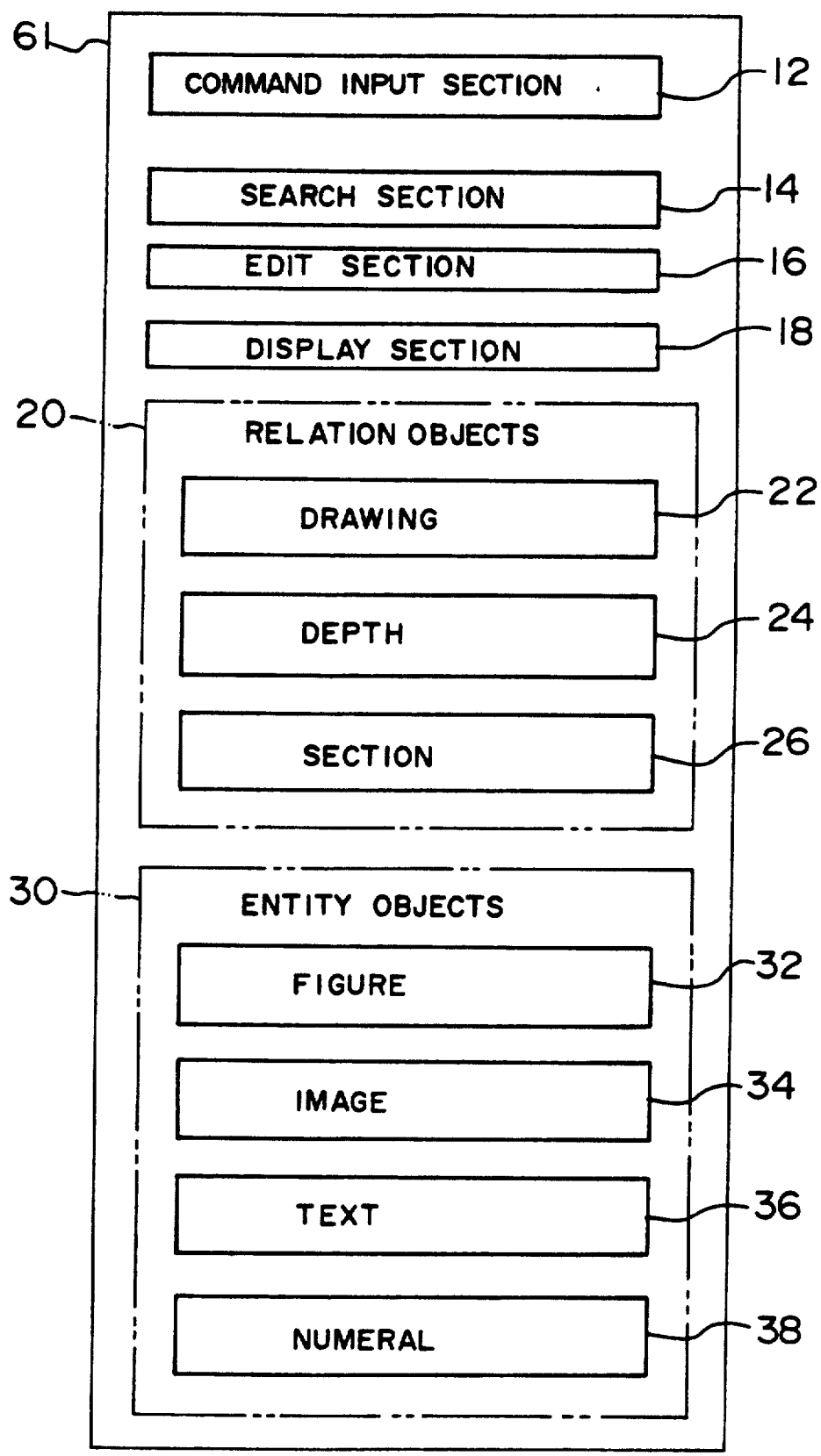
FIG. 4A is a diagram showing necessary functions of a processing apparatus for fulfilling the present embodiment.
Figure 4B:
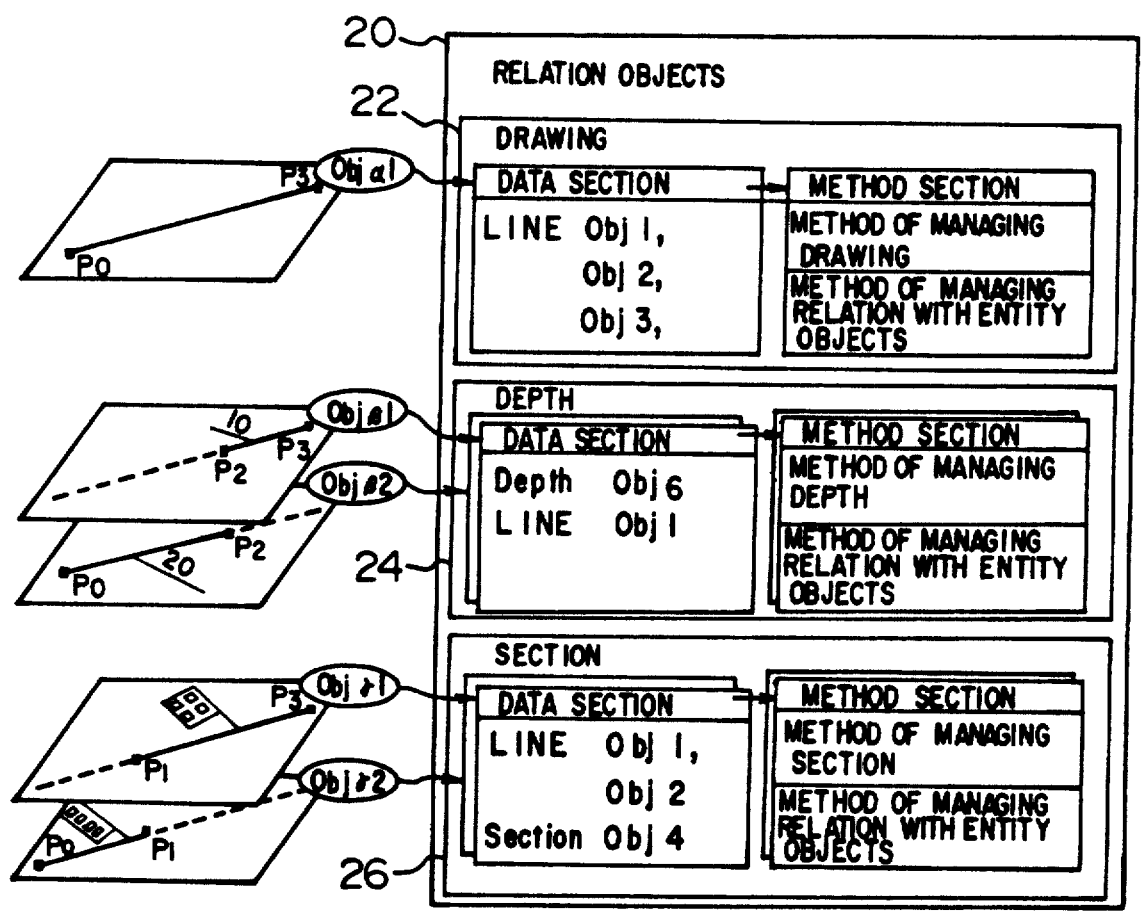
FIGS. 4B and 4C are diagrams showing a principle of the present invention.
Figure 4C:
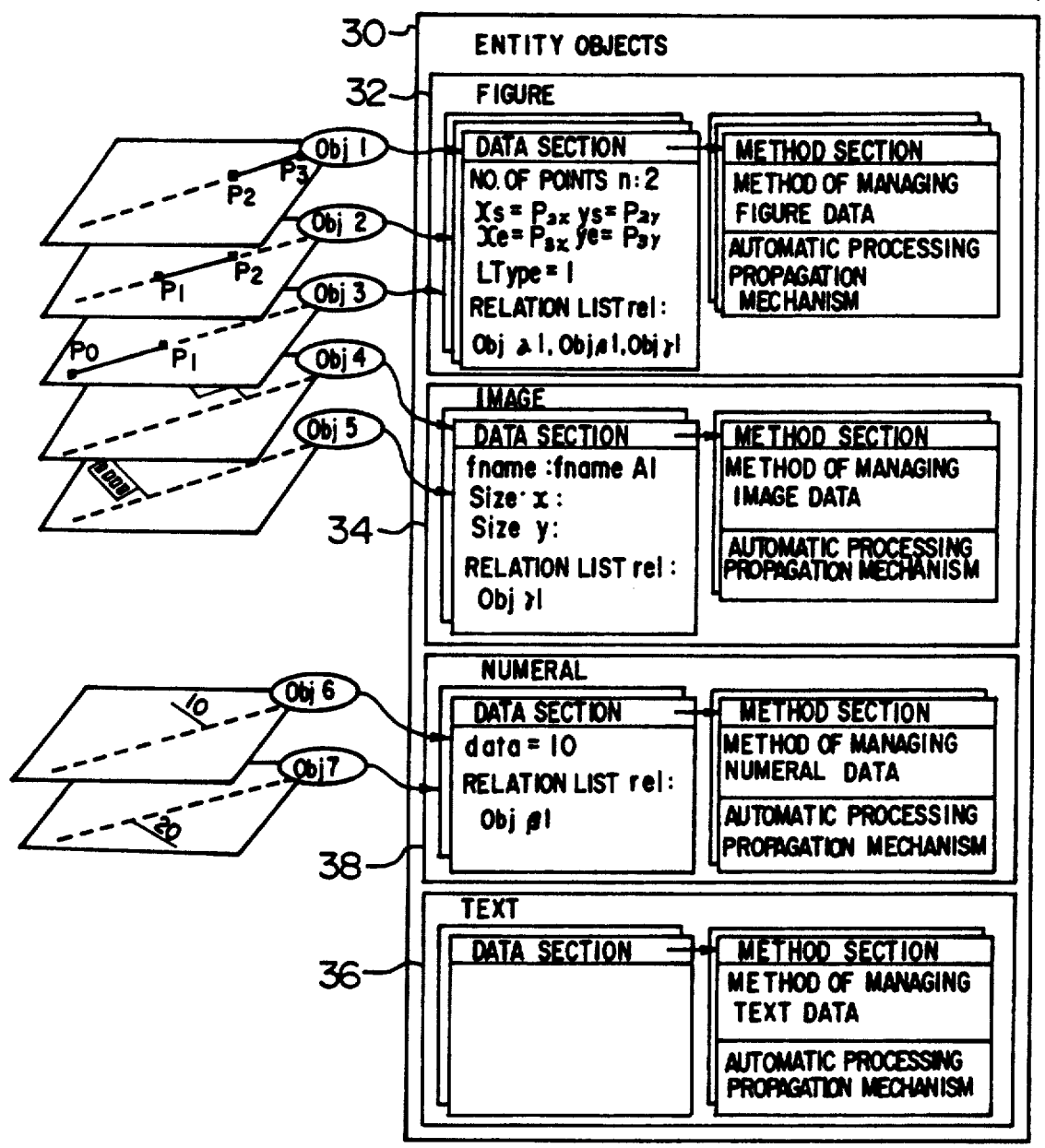

Next, explanation will be given of the processor 61 in a first embodiment of the drawing processing system which is capable of generating objects as shown in FIG. 3A from map or drawing data, editing and modifying the generated objects and storing the processed objects and the semantic structure thereof, with reference to FIGS. 4A to 4C.

The processor 61 includes a command input section 12, a search section 14, an edit section 16 and a display section 18. The processor 61 further includes a drawing class 22, a depth class 24, a section class 26 and so on in a relation class 20, as well as a figure class 32, an image class 34, a text class 36, a numeral class 38 and so on in entity class 30.

The respective classes in the processor 61 will be explained in detail with reference to FIGS. 4B and 4C, taking as examples the map and the underground cable line illustrated in FIGS. 8 and 9. Pictures on the left side of FIGS. 4B and 4C show elements displayed on the screen of the display unit 64, while those on the right side show objects corresponding to the displayed elements.

Data on a map or drawing are registered in entity objects of the entity class for every displayable data piece as a minimum unit. In the above-mentioned example shown in FIG. 4C, three lines $\overline{P_0P_1}$, $\overline{P_1P_2}$, $\overline{P_2P_3}$, two images and two numeral data "10" and "20" are respectively registered in the entity objects of the figure class, the image class and the numeral class. Incidentally, the text class, etc., are in the entity class.

Each object in the figure class, for example, has the number of points for a figure and coordinate data of the points in an internal data section, while each object in the image class has data, such as size of image data, in an internal data section. In addition, each data section has a pointer leading to a corresponding method section in which methods of, for example, displaying or deleting media data such as a figure are described, thereby making it possible to execute a method appropriate to a kind of the media data.

An entity object is generated from data displayable on the screen as a minimum unit for all media, and a relation object is generated from a relation among a set of entity objects. The minimum unit of figure data which can be displayed on the screen corresponds to one vector in the present embodiment. When an attribute value is related to a point, the point is the minimum unit. Also, the minimum unit of section data displayable on the screen corresponds to a combination of the sectional structure and the cable line having this sectional structure in the present embodiment. The respective objects are constructed by a combination of internal data and methods, as mentioned above, and each object corresponds to a display element shown in the left side of FIGS. 4B and 4C.

An entity object belonging to the figure class (simply called a "figure object"; other objects will be termed in the same manner) has media data such as coordinate data of a figure as internal data and a method of handling the media data, such as a method of displaying the figure. The media data include to coordinate data, data on a kind of line and so on constituting a figure in the case of the figure object, and data on a size of an image and so on in the case of the image object. Also, the media data include numeral data in the case of the numeral object and text data such as a school name in the case of the text object.

The method for handling the media data includes a method of managing figure data for the figure object and a method of managing image data for the image object. These methods are stored in the method sections of the respective objects. The figure data managing method includes a method of displaying figure data as media data on a CRT, i.e., DRAW, a method of reading figure data from a file and generating an entity object from the read figure data, i.e., CREATE, a method of moving figure data, i.e., MOVE and so on. The image data managing method includes a method of displaying image data as media data on a CRT, i.e., DRAW, a method of reading image data from a file and generating an entity object from the read image data, i.e., CREATE, a method of moving image data, i.e., MOVE and so on. Similar methods are also included in a numeral data managing method and a text data managing method.

Further, the entity object has pointers to relation objects in the relation class. For example, a figure object corresponding to a vector $\overline{P_2P_3}$ has pointers to relation objects Obj$\alpha$1, obj$\beta$1 and obj$\gamma$1. Also, the figure object has an automatic processing propagating mechanism in the method section. The processing propagating mechanism, for example, when internal data of a figure object are modified, appropriately propagates a processing by announcing the contents of the modification to the relation objects obj$\alpha$1, obj$\beta$1 and obj$\gamma$1. The automatic processing propagating mechanism includes a demon method which is started when internal data of an entity object are modified. For example, when line data of a figure object are modified in an editing operation, coordinate data of the figure object are modified and the figure object starts the demon method to cause the concerned relation objects to execute necessary methods.

The relation object does not directly manage media data indicative of a display element itself such as coordinate data, but solely manages relations between entity objects. The relation object is characterized by a particular one of the media data corresponding to the entity objects. In an internal data section of each relation object, a relation among media data in the displayable minimum units is registered. The displayable minimum unit of media data in the section object is a sectional structure of a cable line and a range of the cable line to which the sectional structure is related. For example, pointers to a set of lines and $\overline{P_1P_2}$ and $\overline{P_2P_3}$ and sectional structure A1 are registered as relation data in the internal data section of the section object objγ1. In the method section of the section object, there are written a method of handling the relation data managed in the relation object and a method of managing a relation with the entity objects. It is not necessary to provide a method of directly managing a relation with other relation objects, as in the prior art. When an editing operation in a relation object influences other relation objects, methods of the related entity objects are started in the method of the relation object, and appropriate methods of other relation objects are started in a method of each entity object.

Figure 10A:
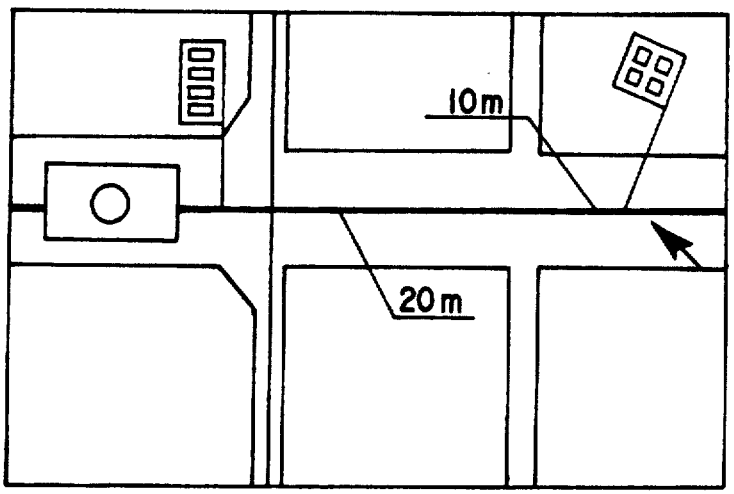
Figure 10B:
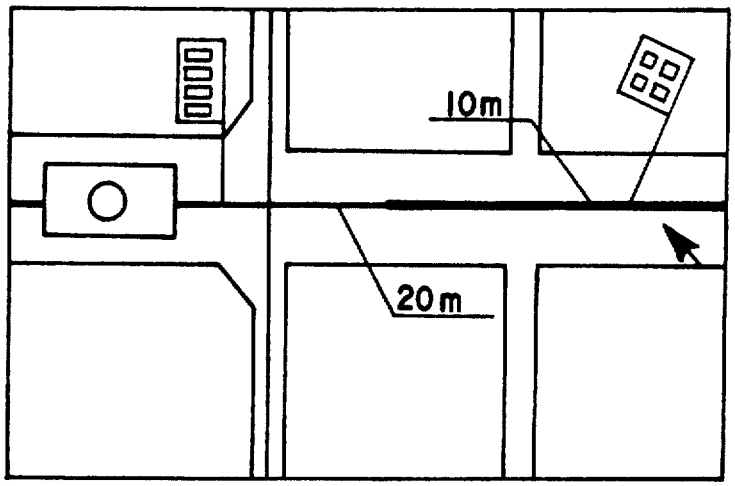

Each relation object has pointers to related entity objects in an internal data section. For example, since the section object Objγ1 has a combination of a sectional structure and a cable line having the sectional structure as its relation data, it has pointers to entity objects Obj1, Obj2 and Obj4. Since the relation object solely manages a relation, a method for commanding the related entity objects to execute appropriate methods is described in its method section. For example, as a display method DRAW of the section object, a method of causing an entity object to execute the method DRAW is written. Therefore, if the method DRAW is executed in the section object Objγ1, the methods DRAW in the image object Obj4 and the figure objects Obj1, Obj2 are also executed, whereby a display as shown in FIG. 10B is obtained on the CRT as the result.

Next, the operation of the drawing processing system of the present invention will be explained with reference to FIGS. 5A to 5C and FIG. 6, based on the map shown in FIG. 8.

Figure 8:
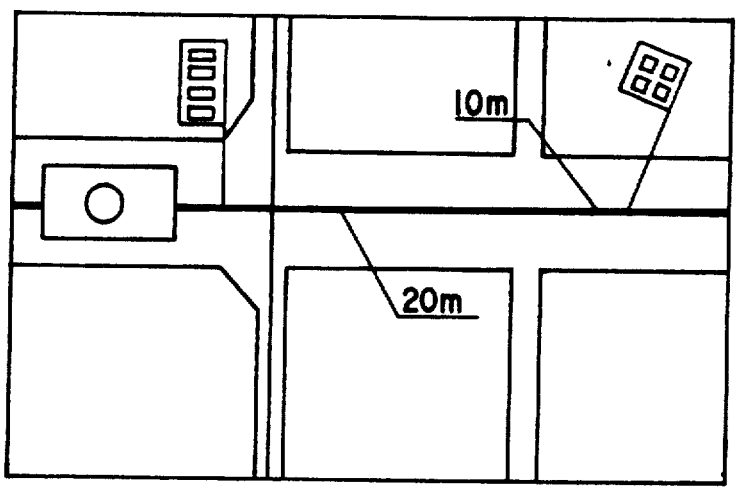
FIG. 8 is a diagram showing an example of a facility drawing in which the present invention is embodied.
Figure 9:
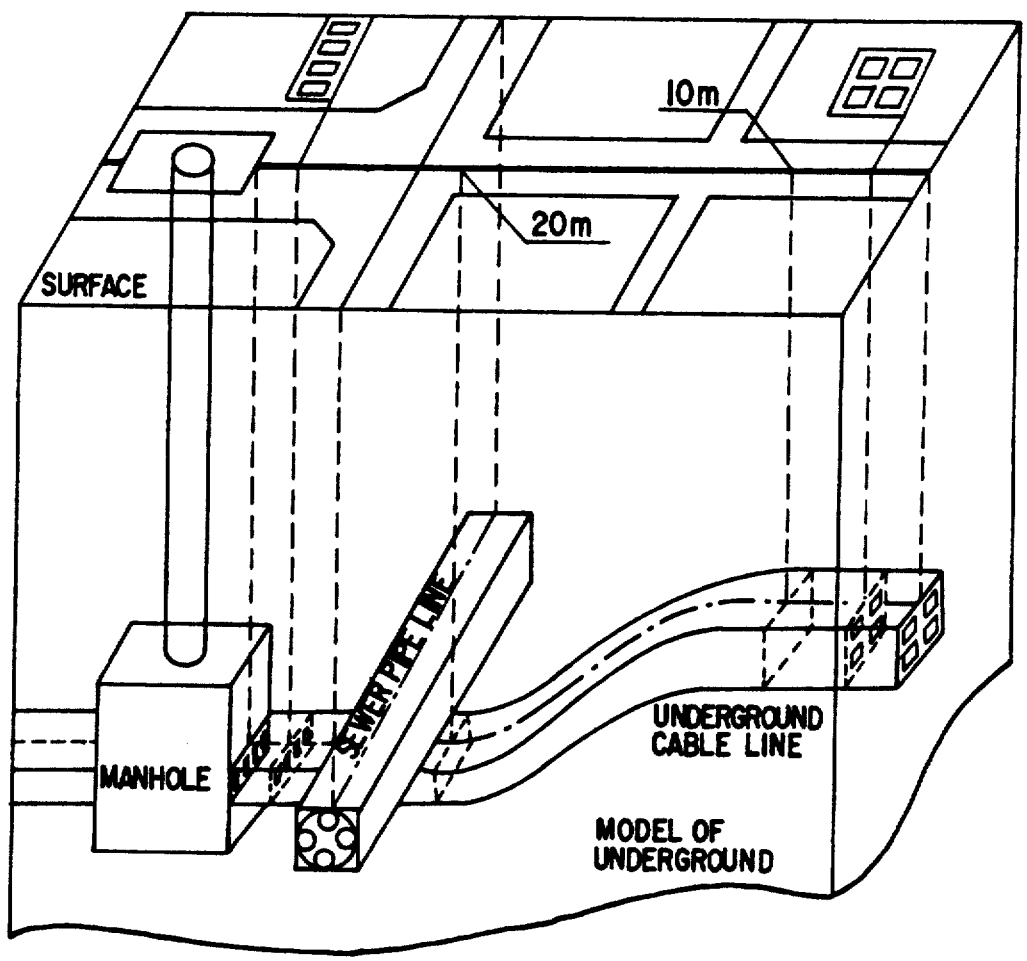
FIG. 9 is a diagram showing a model of a facility managed by the facility drawing of FIG. 8.

FIGS. 5A to 5C show a data structure of the drawing or map shown in FIG. 8 on a file in the database unit 63. The cable line on the drawing is registered as figure data in a coordinate form, not in an image form, in a figure data table as shown in FIG. 5A. Such figure data are electrically filed drawing data or data obtained by reading a drawing on a sheet as an image and automatically recognizing the image by a technique proposed, for example, in a document "Report on Method Design Drawing Automatic Input Technique Workshop" of "Facility Drawing Managing System" by Maeda, Kanechika, Watanabe and Tanaka. FIG. 5B shows a table file for storing relation image data indicative of relations between figure data and image data. FIG. 5C shows a table file for storing relation numeral data which describe relations between the figure data and numeral data. In this example, the image data indicate a sectional structure and the numeral data a depth.

In the figure data table, the number of points constituting a figure (2 bytes), line type information (6 bytes) and coordinate values of the respective points (2 bytes for each of X- and Y-coordinates values) are registered for every figure. In the example of the cable line, a figure representative of a cable line is designated by a number 01, with the line type information being "1". The cable line is represented by the vectors $\overline{P_0P_1}$, $\overline{P_1P_2}$, $\overline{P_2P_3}$ which in turn are designated vector numbers 1, 2, 3, respectively. In the relation image data table, a combination of a figure number and a vector number on the figure data table is used as a vector identifier. Figure data specified by a vector identifier are related with image data. The vector $\overline{P_0P_1}$ is related with an image data file "file A0", and the vectors $\overline{P_1P_2}$, $\overline{P_2P_3}$ an image data file "file A1".

Also in the relation numeral data table, the vector identifier is related with numeral data in the same manner as the relation image data table.

Figure 6:
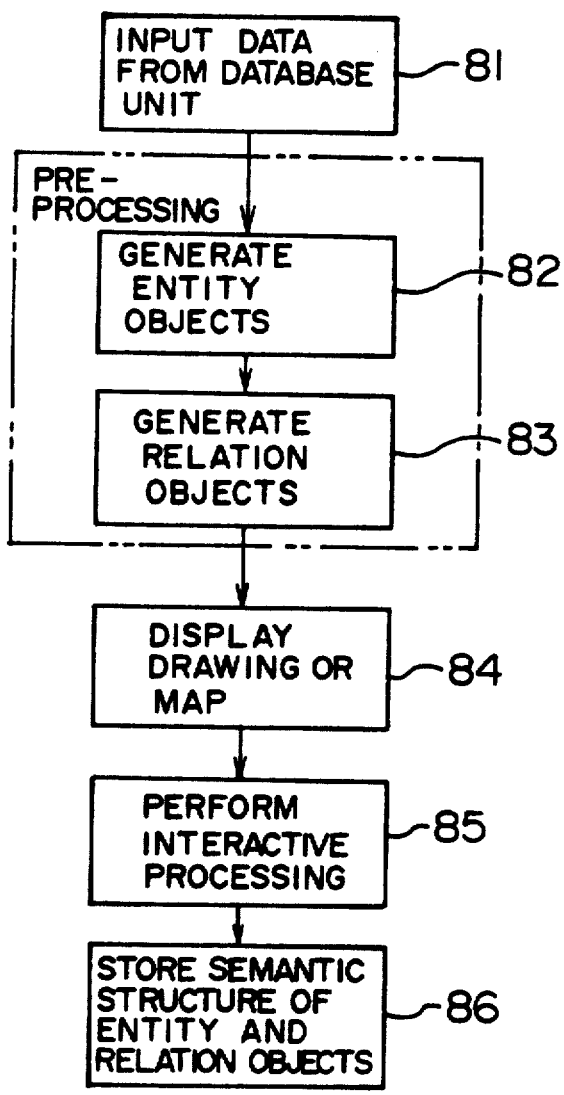
FIG. 6 is a functional block diagram showing an operation of the present embodiment.

When the system is started or a command is inputted to the command input unit 12, the tables of FIGS. 5A to 5C and image data are read into the memory 62 in the processor 61 at step 81 of FIG. 6. Then, the read data are processed prior to editing and search operations. First, entity objects are generated from the read figure data and registered in a figure class (step 82). Next, relation objects are generated from the relation tables shown in FIGS. 5A to 5C and the generated entity objects (step 83).

Next, a procedure (steps 82 and 83) of generating the entity objects and the relation objects will be explained in detail. The respective method sections in the entity objects and the relation objects are functions which the system has in the processor 61. Generation of the entity object and the relation object refers to an operation of generating data sections in the respective objects and registering the same in the classes.

Figure 7A:
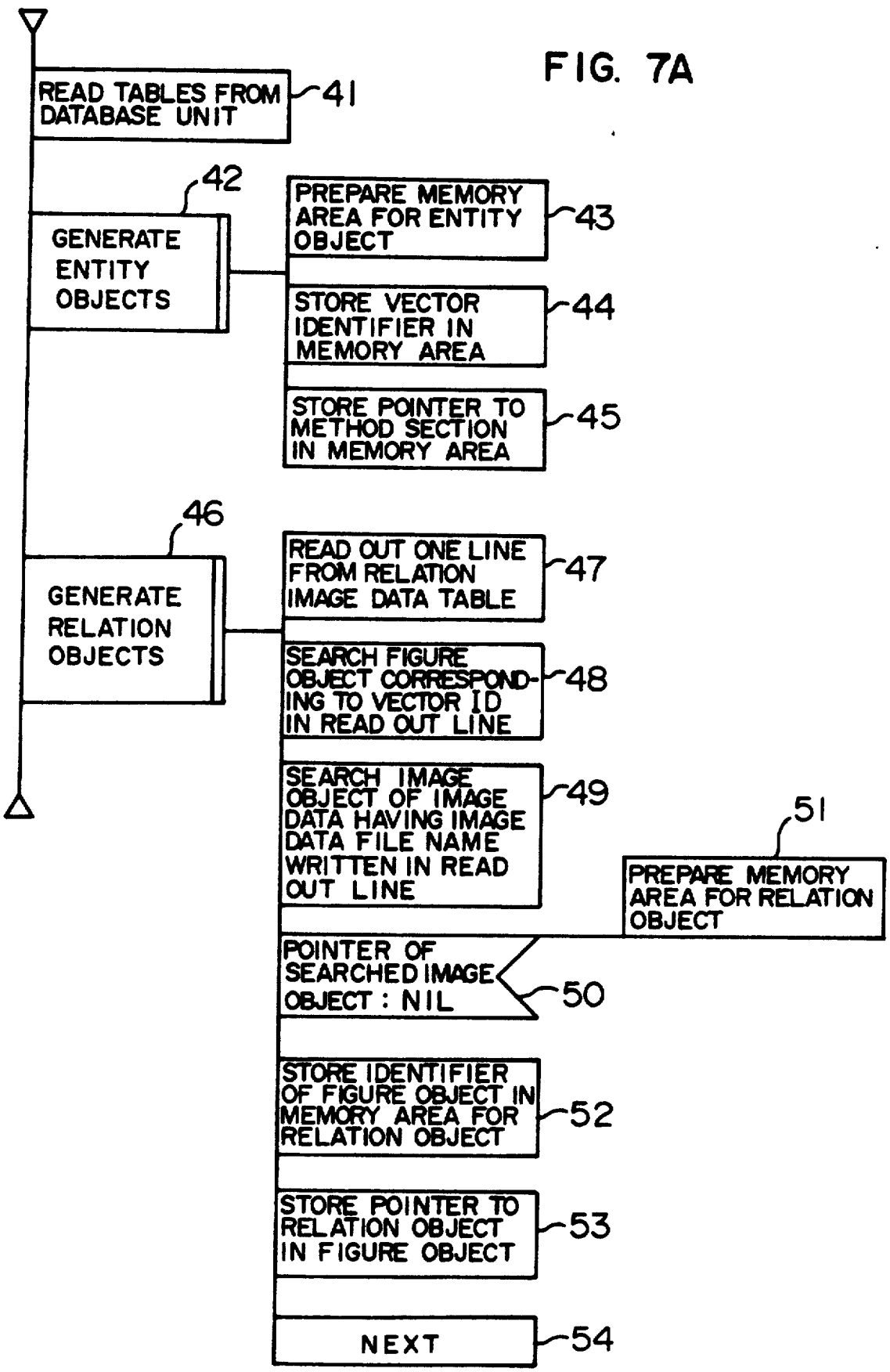
FIG. 7A is a flowchart used for explaining a generation of an entity object(s) and a relation objects.

A method of generating the figure object will be explained as an example. For this function, the method (CREATE) is used in the figure data managing method. The method CREATE generates the entity object through steps shown in FIG. 7A.

In step 41, a figure data table is read as an array from the database unit 63 into the memory 62 by using a file name assigned to the figure data table as an argument. Then, in step 42, the operations from step 43 to step 45 are repeated for each vector (vector i) in the table. In step 43, an area necessary for generation of the entity object is secured. In step 44, the identifier of the vector i is stored in the secured memory area to generate internal data of the figure object, whereby the figure data or the vector can be specified in the figure data table. In step 45, a pointer to a method section of the generated figure object is stored in the memory area.

The above method is described in the figure data managing method section. For example, when a data table is read from the database unit 63 at step 81, a method ReadLine (a file name, an array name) for reading the figure data table from the database unit 63 one line at a time is started.

The relation object is generated according to the method CREATE in the corresponding relation managing method section. For example, a relation object in the section class (a section object) is generated through the following steps by using the corresponding figure objects, an image object corresponding to the sectional structure and the relation image data table of FIG. 5B.

In step 47, table elements are read from a selected file one line at a time by using a file name assigned to a relation image data table as an argument, and the following operations are executed. In step 48, a figure object corresponding to a vector identifier registered in the readout line (hereinafter called "the line i") currently processed is searched. The searched figure object is set to be a figure object L__1. In step 49, an image object of the image data having an image data file name registered in the line i is searched. The searched image object is set to be an Image object I__i. In step 50, if a pointer value of the image object I__i to a relation object is NIL (NIL is inputted as an initial value), step 51 is executed. If the pointer indicates an existing relation object, this relation object is set to be a relation object i and step 52 is executed. In step 51, a memory area necessary for generation of the relation object (called the relation object i) is secured. In step 52, an identifier of the figure object L__i is stored in an internal data section of the relation object i as internal data. In step 53, a pointer to the relation object i is added to the figure object L__i. In step 54, the process advances to the next line (i+1), and the flow returns to step 46.

When all the processing for the relation image data table has been completed, the display section 18 causes each entity object to execute the method DRAW in the method section thereof. As a result, an image as shown in FIG. 8 is displayed on the display unit 64 in step 84.

Then, a search operation or an editing operation is executed at step 85 of FIG. 6. First, the search operation will be explained with reference to FIG. 7B.

Figure 7B:
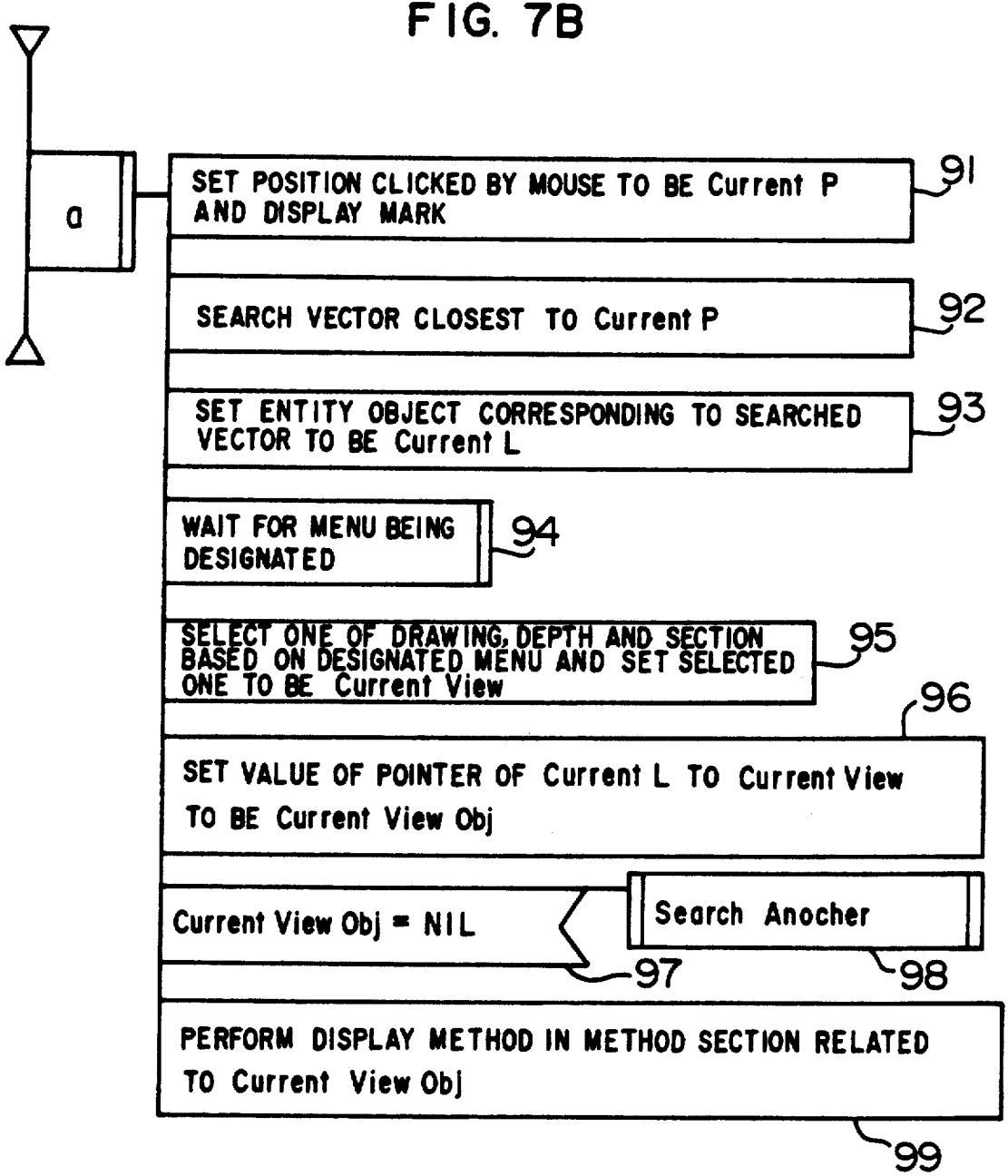
FIG. 7B is a flowchart showing an operation of searching for other entity objects related with a figure object at a selected point and displaying the same on a display when the user selects a position on a display, and a way of looking at data.

FIG. 7B is a flowchart showing the procedure when the user selects a point on the display unit 64 and thereafter the search operation is selected from the menu. First, when a coordinate position indicative of the point on a displayed map or drawing being currently processed is selected by the mouse 65, step 91 is executed by the command input section 12. At step 91, a marker is displayed at the selected coordinate position on the screen of the display unit 64 (CurrentP) by the display section 18 as shown in FIG. 10A. At step 2, the vector most proximal to CurrentP is searched. Such search methods include, for example, a method as shown in a document "Figure Managing System by Optimal Cell Method" by Shimada and Kurata, published in "Papers for 37th Meeting of National Conference of Information Academy". This method previously generates an index indicating a figure object corresponding to a vector and utilizes the same. At step 93, the figure object corresponding to the most proximal vector is set to be CurrentL. In an example shown in FIG. 11, the figure object Obj1, i.e., the vector $\overline{P_2P_3}$ is searched as CurrentL at step 93.

Next, an operation menu is displayed by the command input section 12 at step 94, and the system enters an input waiting state. It is assumed that a search operation for a section class is selected from the menu by the mouse 64. In the present embodiment, it is possible to select any one of a section search operation, a depth search operation, a drawing editing operation and so on from the menu. If the section search operation is selected from the menu, a search for the section class is executed. In the same manner, if the depth search operation is selected, a search for the depth class is executed. When a search operation is selected, the search section 14 is enabled, and when the editing operation is selected, the edit section 16 is enabled. In this example, the section search operation is assumed to be selected. At step 95, a designated class is set to be CurrentView.

At step 96, a pointer value of CurrentL to CurrentView is set to be CurrentView Obj, and at step 97 the value of CurrentView Obj is examined. If it is determined at step 97 that NIL (the value indicating that the pointer is empty) is stored as the pointer value, a function Search Another is executed at step 98. This function searches for a figure object corresponding to a vector second closest to CurrentP, and newly sets this searched figure object to be CurrentL. Thereafter, a procedure after step 96 is executed. If it is determined at step 97 that the pointer indicates an existing relation object, this relation object is commanded to execute a display request. In this example, when the section class is designated as CurrentView at step 95, the figure object Obi1 has pointers to the relation object Objα1, Objβ1 and Objγ1 so that the section object Objγ1 is selected. At step 99, the section object objγ1 is commanded to execute a display request.

Figure 11:
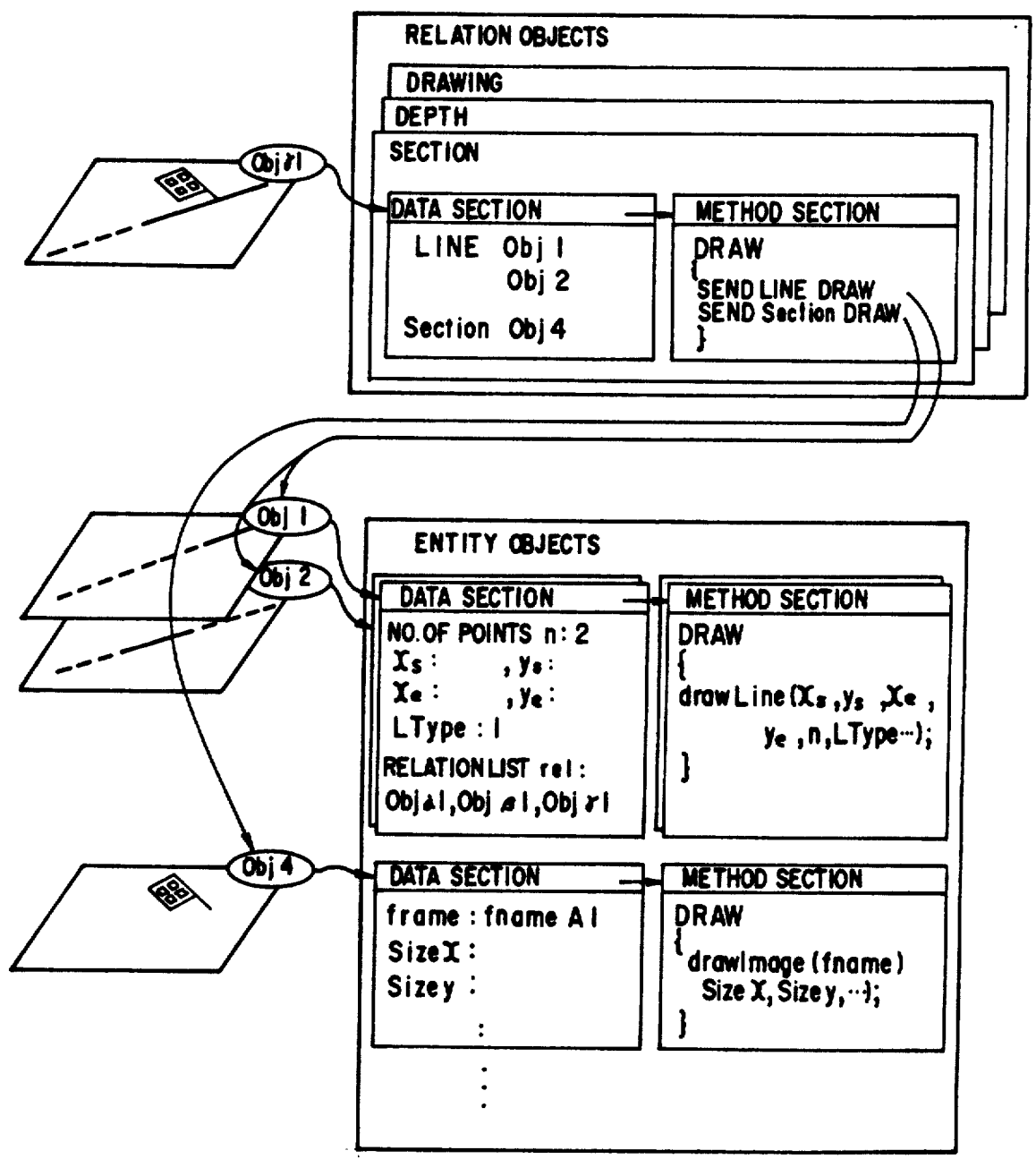
FIG. 11 is a diagram showing an example of a section search operation.

A method executed by the section object objγ1 is described in a relation managing method with the entity objects, of the method section, as shown in FIG. 11. In this method section, there is described a method for commanding all of the entity object (the figure object obj1, obj2 and the image object obj4 in this example) corresponding to identifiers registered in the data section of the section object objγ1 to execute a display request. The figure objects obj1, obj2 each execute a display method described in a corresponding figure data managing method, while the image object Obj4 executes a display method described in an image data managing method. The display section 18 is started by the display method and a display, for example, as shown in FIG. 10B, is achieved. Thus, when a facility such as a cable line is managed by the use of a map or drawing, it is possible to display not only the sectional structure on the cable line but also a range of the cable line to which the sectional structure is related.

After the above-mentioned search operation or an editing operation later referred to, a semantic structure representing the generated or edited entity objects and the relation objects is stored in the database unit 63 as a system model at step 86.

Next, an example of a drawing editing operation will be explained with reference to FIGS. 12A to 12C.

Figure 7C:
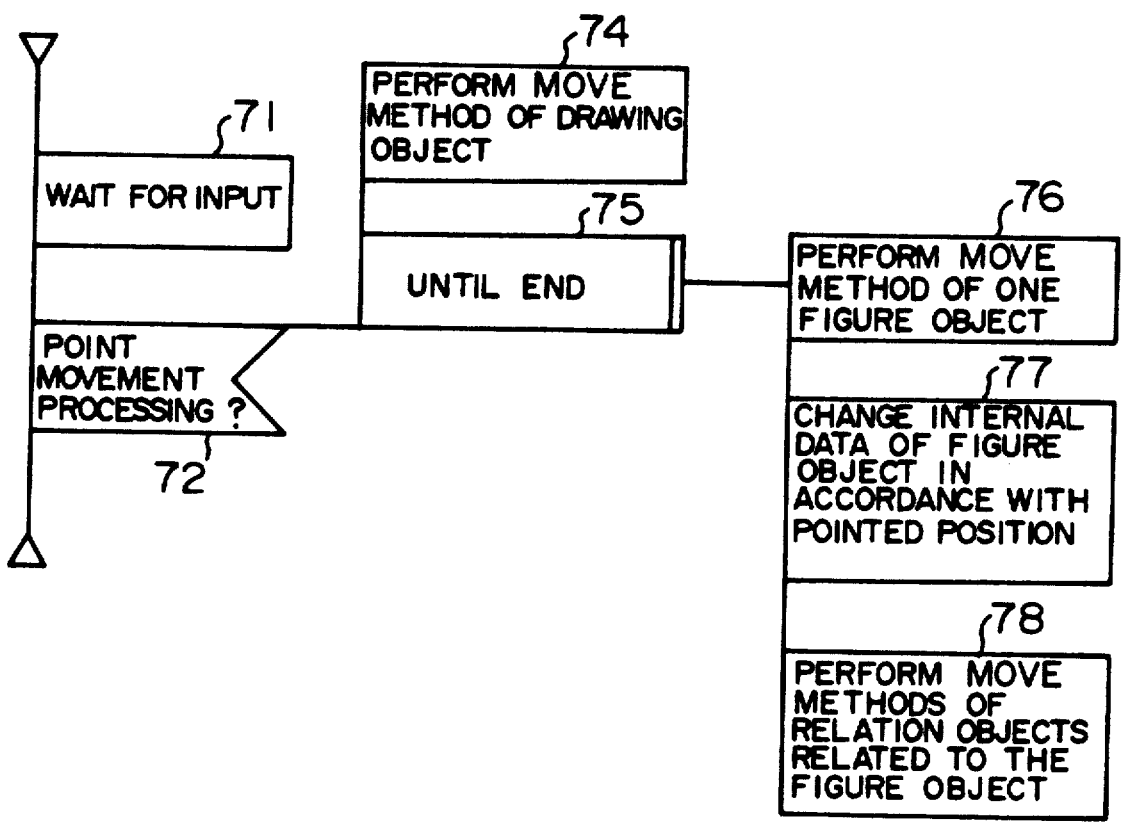
FIG. 7C is a flowchart used for explaining an editing operation relative to a shape.

When a point P3 is selected at step 91 of FIG. 7B, and the drawing editing operation is selected from the menu at step 95, the drawing object Objα1 is selected, the steps from 96 to 99 of FIG. 7B are executed and a display as shown in FIG. 10A is achieved. Referring to FIG. 7C, an input from the menu is awaited in this state (step 71). If a point moving operation is selected and the point P3' is selected by the mouse 65 (step 72), since the vectors $\overline{P_0P_1}$, $\overline{P_1P_2}$, $\overline{P_2P_3}$ are regarded as a set in the drawing object Objα1, the figure objects Obj1, Obj2, Obj3 are specified by pointers in the internal data section of the drawing object Objα1, and then internal data of the set of figure objects are changed to move the cable line from the vector $\overline{P_0P_3}$ to $\overline{P_0P_3'}$.

After the cable line is moved, an image of the section structure related with the moved vector $\overline{P_0P_3'}$ is also moved (step 75). It should be noted however that a state shown in FIG. 12B is conceptive and is not actually displayed.

The above processing propagating method will be explained. When internal data of the figure objects Obj1, Obj2, Obj3 are modified by the above-mentioned drawing editing operation, an automatic processing propagating mechanism is started. The basic principle of the automatic processing propagating mechanism lies in providing a demon-type method which is started when internal data of an entity object are modified. Specific contents will be explained with reference to FIG. 7C.

In a step 76, when the method MOVE in the drawing object Obja1 is executed (at step 74), the methods MOVE in the figure objects Obj1, Obj2, Obj3 managed by the drawing object Obja1 are executed. The following steps are executed in each figure object (called Obji). In a step 77, the coordinate after movement is calculated, and internal data values in the figure object Obj1 are modified as shown in FIG. 12B. Since the internal data have been modified by this operation, the automatic processing propagating mechanism in the figure object is started to cause each relation object registered in a relation list of the figure object Obj1 to execute the method MOVE. In a step 78, the method MOVE is started in the respective relation objects, and it is determined whether or not each relation object is influenced by the modification of the figure object. Then, necessary operations as shown in FIG. 12C are executed.

By the above operations, data such as image data of the sectional structure related to the vector $\overline{P_0P_3}$ are also moved.

Another embodiment of the present invention includes a method of displaying necessary data by utilizing vector data recognized from an image such as a map, wherein the method employs image data or a mixture of image data and vector data as map or drawing data, and recognizes and symbolizes image data as one of the functions performed by the processor 61.

Also, in another embodiment of the present invention, a method is employed in which each figure data is provided with a key which is not the relation format as shown in FIGS. 5B, 5C is employed, a data format is used so as to allow a search operation for data related to the vector on the basis of the key, a relation between figure data and other data is registered in the memory 62, and the data are read from the database unit 63 by matching the keys.

A system having a user interface which allows the user to select an operation function not by a menu, but by dialing, is also one of the embodiments of the present invention.

Figure 14A:
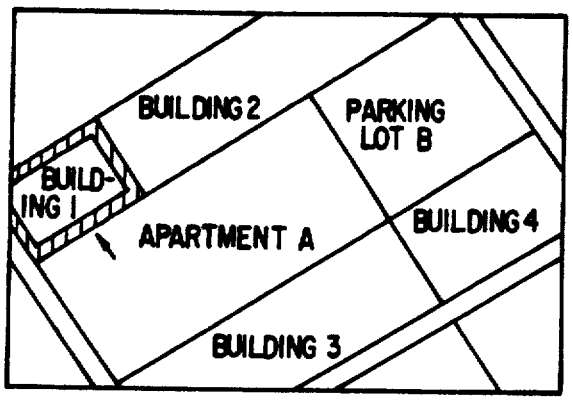
FIGS. 14A to 14C are diagrams showing an example of a display on a screen on which a figure is composed of a plurality of figure elements managed by drawing in which the present invention is implemented.
Figure 14B:
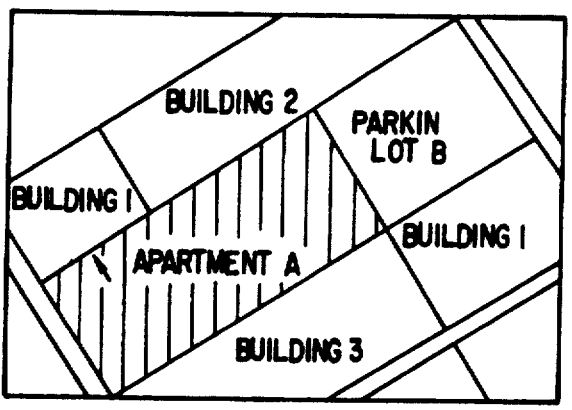
Figure 14C:
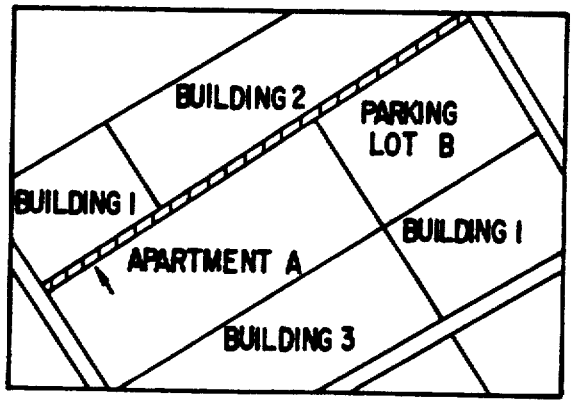

Further, a display method is also one of the embodiments of the present invention, wherein a viewpoint is changed after selecting a point on a common figure, when a plurality of figures are managed by a drawing. For example, a frame of a building 1 as relation, as shown in FIG. 14A, a portion of a frame of an apartment A as relation, as shown in FIG. 14B, or a road as relation as shown in FIG. 14C, may be displayed.

According to the present invention, by selecting a point on a drawing or map and a viewpoint of data from a menu or a dial, the user can search for data related to the selected point and display the same without knowing anything of an internal data structure of a database, thereby making it possible to visually provide a database structure to the user. Therefore, even a user who is to access the database for the first time can readily carry out operations for adding and editing data to the database. In addition, since the relation data are managed in respective classes, it is possible to search for a kind of data by selecting a point and display data related to the searched data in a certain viewpoint. Further, it is possible to readily obtain information on a range which has the same attribute value as the selected point depending on different viewpoints.

Next, a second embodiment of a multimedia processing system according to the present invention will be explained.

Figure 15:
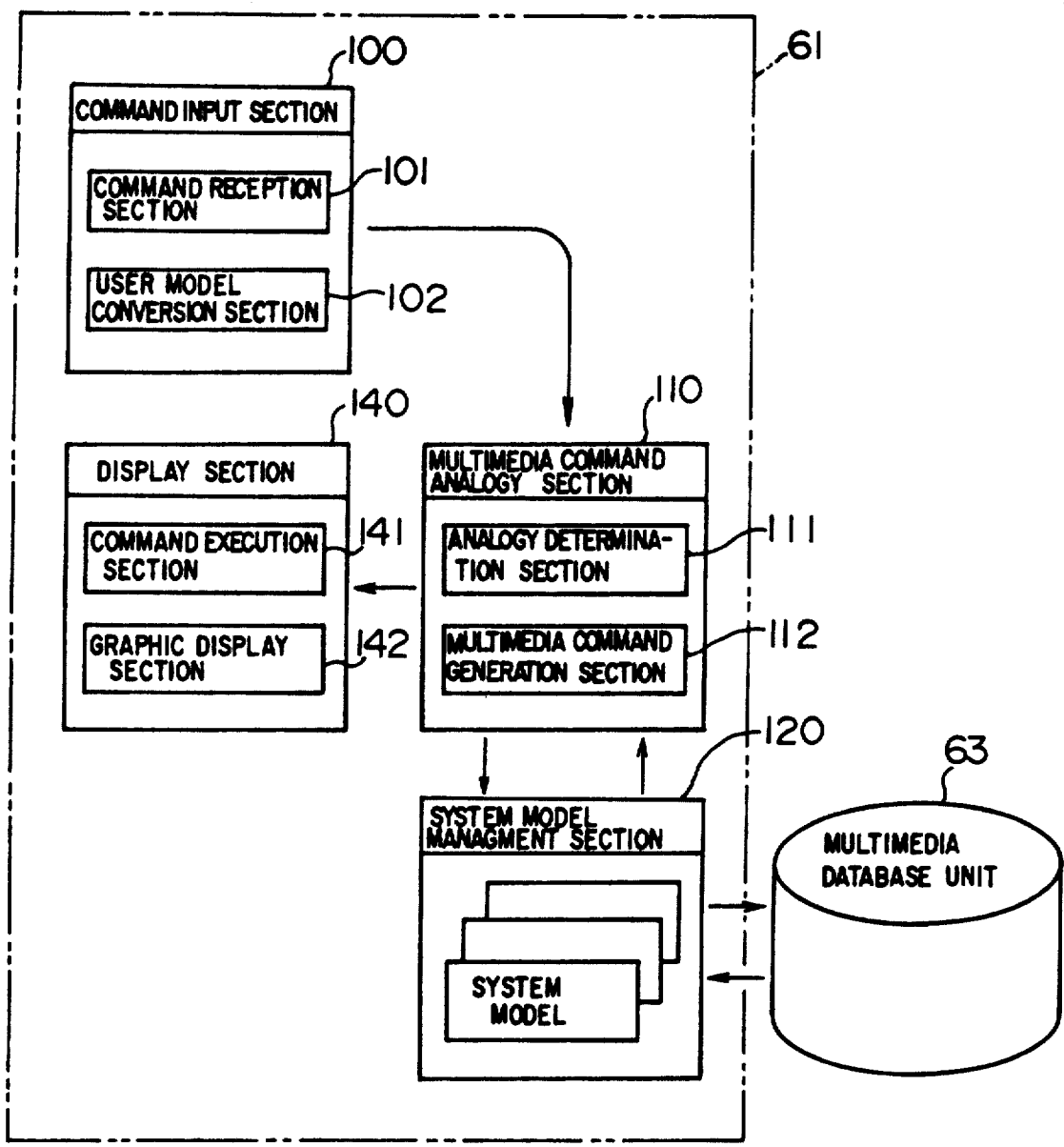
FIG. 15 is a functional block diagram showing an example of a functional structure of a second embodiment of the present invention.

First, a structure of functional blocks of the processor will be explained with reference to FIG. 15. The processor 61 includes a request input section 100, a multimedia command analogy section 110, a system model management section 120 and a display section 140.

The command input section 100 has a command reception section 101 and a user model conversion section 102, and is provided with user interfaces such as a menu and commands to receive a command from the user and to analyze its meaning. An inputted command for a search operation or an editing operation is converted to a user model having a semantic structure in an object form by using these interfaces.

The multimedia command analogy section 110 comprises an analogy determination section 111 and a multimedia command generation section 112, and has functions of extracting a structure portion most proximal to a converted user model semantic structure from a semantic structure of a multimedia system model stored in the model management section 120, and synthesizing the extracted structure portions to convert a command inputted to the section 100 to a multimedia command which is actually executed.

The system model management section 120 stores the system model into the multimedia database unit 63 and reads the same therefrom. As shown in FIG. 3A, a meaning possessed by each medium itself, such as a figure and an image, and a meaning generated from a relation among a plurality of media, are described in an object structure. Special methods for each media are also described in the corresponding object structure. The section 120 has a function of automatically executing the special methods for each medium even when a macro multimedia command is inputted.

In the multimedia database unit 63, different kinds of media data such as a figure, an image and a sound can be stored in a single recording medium. It is also possible to record the same kind of media data on different recording media such as an optical disc and CD-ROM. Read and write operations for each of the media data are controlled by a special media management program provided in the section 120.

The display section 140 has a command execution section 141 and a graphic display section 142 and graphically displays the results of a search operation and an editing operation on a window or the like of a work station or the like.

Next, the respective sections in FIG. 15 will be explained in detail.

The command reception section 101 receives the contents of an operation requested by the user and delivers a command with a specific parameter representative of the content to the user model conversion section 102. The requests from the user for multimedia processing are diversified, and in addition even similar requests are subtly different in conditions. In the present embodiment, template object models representative of semantic structures of the multimedia are defined in advance for respective requests for the multimedia processing. The user selects a particular template model among the template object models through a menu and/or by a command as an interface and further selects subtly different conditions and so on through a menu and/or by a command in a deeper layer.

For example, supposing that a template model for a guide map generating operation is selected through a menu, it is considered to further specify a guide map form, a guide condition and so on as condition items. This form may include (i) a navigational guide between two points, (ii) a guide in the vicinity of a destination, (iii) a navigational guide among plural points, and so on. Also, as the guiding conditions, place names such as a departure point, a destination position, routing points and so on, as well as road names may be considered. These items are selected by a hierarchically structured menu or command and delivered to the section 102 as the specific parameter.

Figure 21:
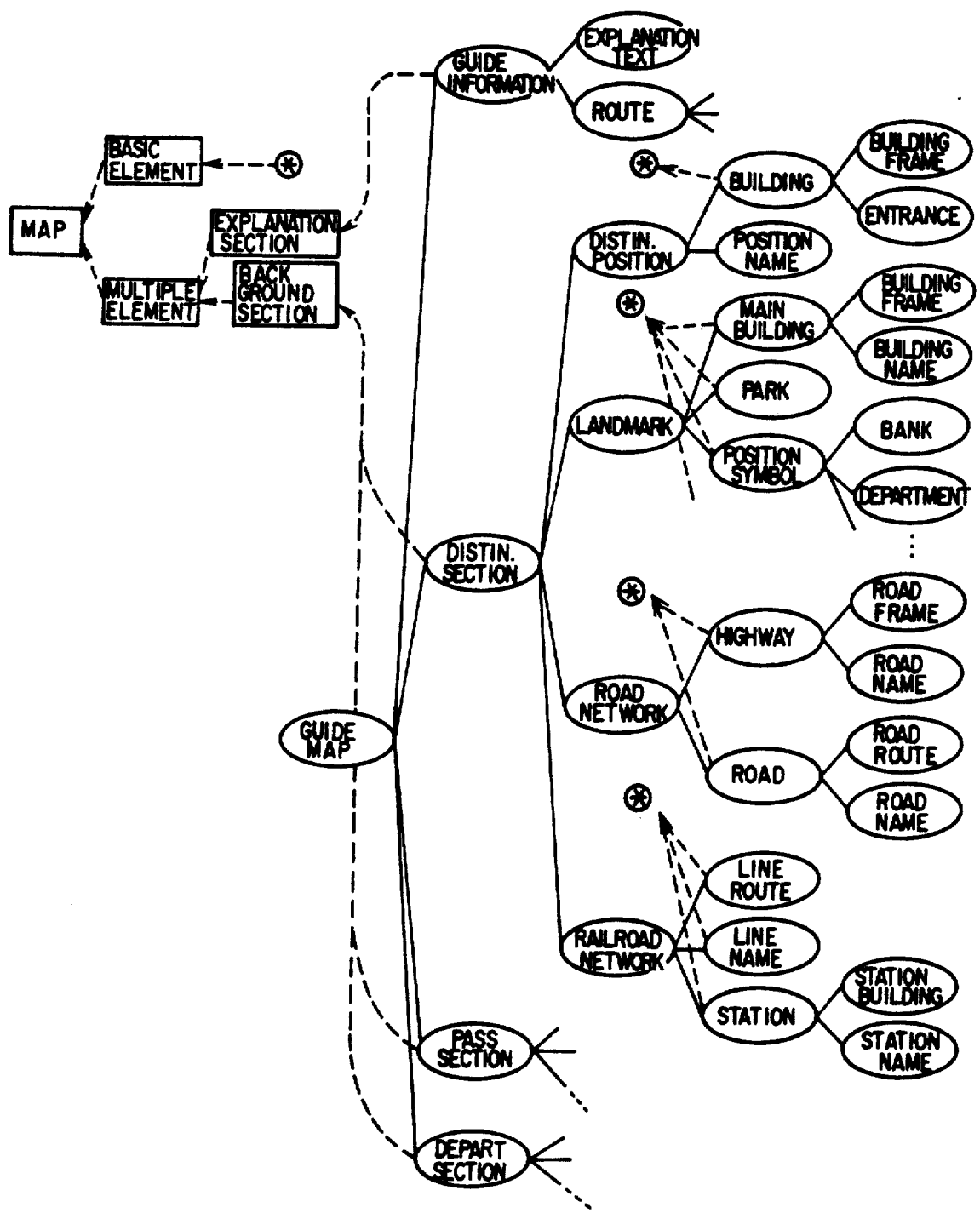
FIG. 21 is a diagram showing a semantic structure of a guiding map.

The user model conversion section 102 reflects the parameter given as the items to the selected template model. A processing request from the user is converted to a user model having a semantic structure as shown in FIG. 21. A basic portion of the conversion lies in that structure portions of the template model related to selected items are solely extracted since the template model represents a general semantic structure capable of coping with a variety of requests, and the extracted structure portions such as the name of a departure point, the name of a destination position and so on specified as the items are embedded in the user model, i.e., are represented in internal data sections of objects corresponding to the user model. In other words, the user model is generated by removing structure portions other than portions related to the items from the template model.

The analogy determination section 111 determines an analogy between the user model generated by the section 102 and a system model relative to the multimedia stored in the section 120, i.e., coincidence of node properties of the semantic structure between the two models.

The multimedia command generation section 112 sequentially selects one by one, as matching candidates, nodes in a scope of the system model object structure, in addition to the analogy determined by the section 110, and evaluates a substituting possibility on the "is-a" layer structure of the object semantic structure when a corresponding structure portion of the user model is substituted by the matching candidate to thereby determine the matching candidate. The section 112 replaces the corresponding portion of the user model with the determined matching candidate and adjusts the "is-a" layer structure to generate an executable object structure.

Figure 16:
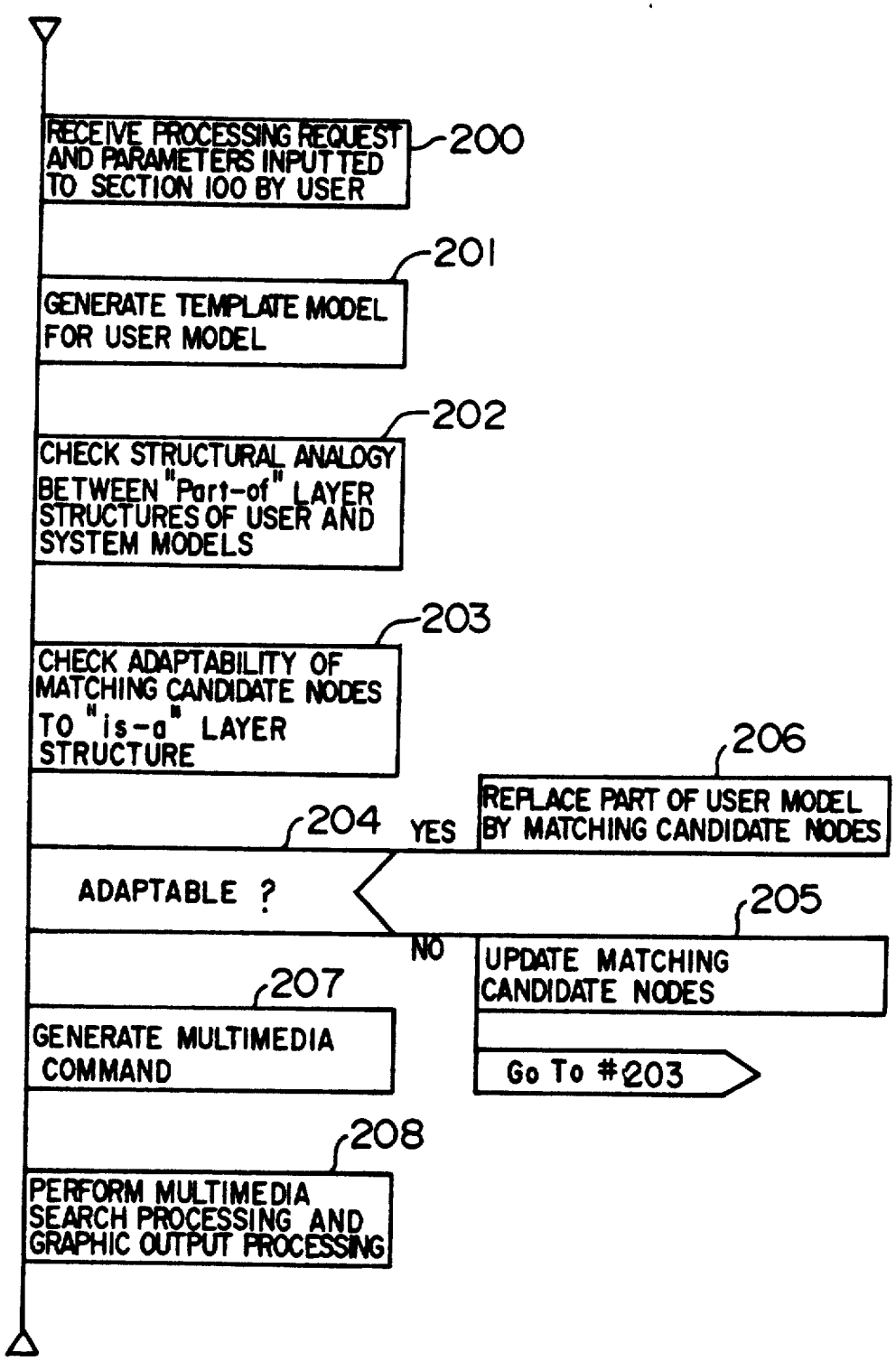
FIG. 16 is a flowchart showing a procedure of an operation performed by the system illustrated in FIG. 15.

Next, a procedure of operations from inputting a processing request by the user to displaying the results of the processing on a graphic terminal in the above-mentioned structure will be explained in detail with reference to FIG. 16, taking as an example a process of generating a guide map provided with contents requested by the user from an existing residence map.

First, a processing request and parameter inputted by the user to the command input section 100 as menus or commands are received at step 200. Next, at step 201, the received processing request is decoded, and a template object model for a user model is selected among template object models separately prepared for respective processing requests. The parameter specified by the user is stored in a corresponding location of the selected template object model to generate a user model.

Figure 23:
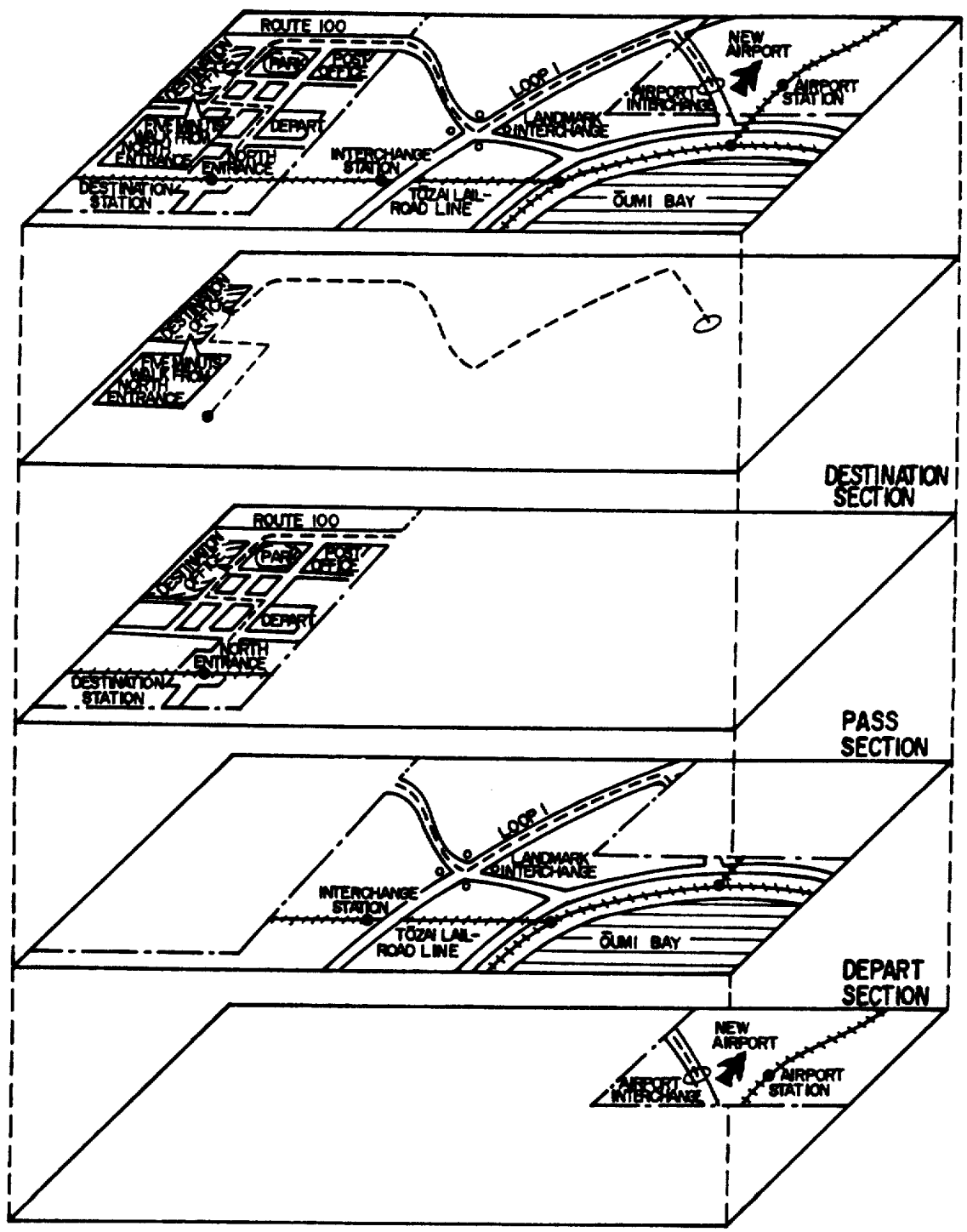
FIG. 23 is a diagram showing display components of a guiding map.

A portion of the semantic structure of the selected template object model is shown in FIG. 21, and a system model of an ordinary map system as shown in FIG. 3A is previously stored in the multimedia database. On the other hand, FIG. 23 shows an example of a guide map obtained as the processing results, the guide map showing a navigation route from a departure point to a destination point. This guide map is characterized by being divided into three areas of a depart section, a pass section and a destination section on a single screen, and scales of the respective sections are different.

The semantic structure of a user model for this guide map is as shown in FIG. 21. In the semantic structure, a "part-of" layer including the destination section instance, the pass section instance, the depart section instance and guide information instance exists. Under the destination section instance, there exists a "part-of" layer comprising a destination position instance, a landmark instance, a road network instance around the destination position and a railroad network instance around the destination, and further, under the landmark instance, a "part-of" layer exists comprising a main building instance, a park instance and a position symbol instance representing the position.

Apart from the "part-of" layer structure, there exists an "is-a" layer structure. Beneath a guide map class, an "is-a" structure comprising a basic element class and a multiple element class exists, and beneath the multiple element class, explanation section and background section classes exist. Further, the explanation section class is hierarchically provided with a guide information instance. Also, the background section class is hierarchically provided with the destination section instance, the pass section instance and the depart section instance.

The semantic structure of the user model for the guide map shown in FIG. 23 is almost the same as that of the template model. However, in a case where it is determined by the section 101 that a processing request from the user is to generate a guide map near a destination, the semantic structure portions related to the pass section instance and the depart section instance are not necessary in the template model. For this reason, the structure portions related to the pass section instance and the depart section instance are first omitted from the whole semantic structure of the template model, while the contents of an internal data section of a position name instance are substituted by a place name given as a destination position. Meanwhile, a route instance in a "part-of" layer structure portion of a guide information instance is set for navigational guide between two points and a navigational guide among plural points, so that the route instance is also omitted.

Thus, the semantic structure of this user model is temporarily generated by the section 102 in response to the processing request from the user for generating the guide map, independent of the system model.

At step 202, based on the "part-of" layer structures of the user model and the system model managed by the section 120, matching candidates for both are inferred by the section 110. This operation will be specifically explained by the use of FIG. 17.

First, an analogy of a user model and the system model is examined. For this purpose, an operation for determining a position of a central node or instance in a layer structure of each model is performed. For determination of the central node position in the user model layer structure, a viewpoint node position is changed over the node range from topside to downside and from left to right of the layer structure (step 300).

At this time, a node without a flag set is selected among those nodes to be the central node position for the analogy determination operation (step 301). Each flag may be set in a corresponding data section or a table for flags may be prepared in the section 110. This selected node of the user model layer structure is referred to as a matching source node, a property of which is extracted from descriptions for the user model and set to be UPi (step 302).

Next, for determining a central node position of the system model layer structure as a matching destination node, all the nodes in the system model are examined with respect to the matching with the property of the source node. The matching destination node is selected, in the same manner as the previous order of search of the source node for the user model, by sequentially picking up all the nodes within the system model from topside to downside and from left to right of the layer structure (step 303). The property of the selected matching destination node is extracted from the descriptions for the system model and set to be SPk (step 304).

Then, the matching of this property SPk to the property UPi is examined, and if they are not coincident at all with each other, a next node of the system model is selected as the matching destination node (step 305). On the other hand, if they are nearly coincident, the matching destination node of the system model is temporarily determined. When the destination node is not determined, a flag is set for the matching source node and a next matching source node is selected. Thereafter, the same operation is repeated.

When the destination node is determined, a scoping operation (step 306) for the user model is performed for extracting a lower structure portion in a predetermined range with the matching source node of the user model as the center node, while a scoping operation (step 308) for the system model is performed for extracting a lower structure portion in a predetermined range with the matching destination node of the system model as the center node, whereby object portions of the analogy calculation are limited. At this time, flags are set for nodes within the scoped lower portion of the user model structure (step 307).

Figure 22:
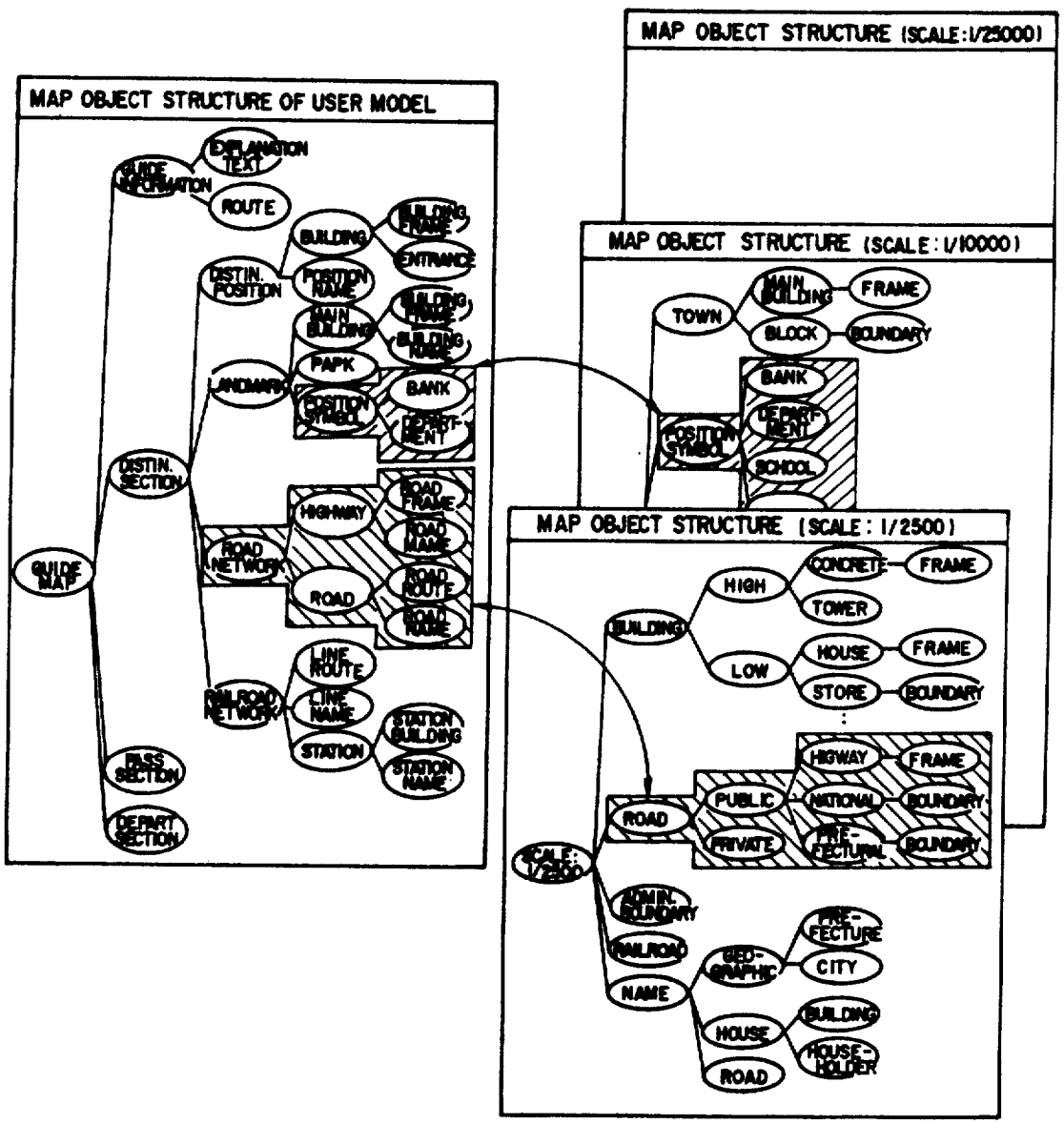
FIG. 22 is a diagram showing the principle of an analogy-type structure matching between a user model and a system model.

Now, a specific correspondence to the semantic structure of a map will be considered, applying to FIG. 22. Assuming that a road network instance is selected to be the matching source node in the user model for the guide map, while and a road instance as the matching destination node in a 1/2500 map semantic structure as a system model, scopes of the user model and the system model are "part-of" layer structure portions as indicated by slashes in the drawing. An analogy matching processing corresponds to examining matching of the properties among respective nodes in these scopes indicated by slashes. Particularly, scopes derived as matching candidates also exist in semantic structures of the system models for maps on scales of 1/10000 and 1/25000, in addition to the semantic structure of the 1/2500 map. The scopes are temporarily stored in a list along with the analogy S of each scope with the corresponding scope within the user model, and one is determined among them in the execution command generation section 112.

This scoping operation is based on horizontal search processing for the present structure, and performs a sequence of searches in which a destination node is moved from a node with a highest level to a node with a deepest level in the depth direction of the layer structure, and then a node with the same level is again searched, as introduced by the document "LISP" by P. H. Winston. By this operation, it is possible to define a scope of a set of adjacent nodes as a tree structure. However, since a simple horizontal search processing may advance to the most distal node, i.e. a leaf node, a parameter relative to a search depth, i.e., a scoping parameter is set in this embodiment so as to prevent the search processing from advancing beyond a predetermined depth. This parameter value for the search processing is changed in the cases of a scoping operation for the user model and that for the system model. Generally, by setting the parameter value so as to broaden the scoping operation in the latter case, it is possible to prevent oversight in the analogy calculation.

Next, an analogy of the "part-of" layer structure portions existing in the scopes of the user model and the system model determined by the above operation is calculated (step 310). This analogy calculation is basically equivalent to determining how many nodes existing in the user model scope correspond to nodes in the system model scope. Particularly, the analogy relative to positions of corresponding nodes in the layer structure will be considered separately, and thus is not included in the analogy count at this step.

Figure 18:
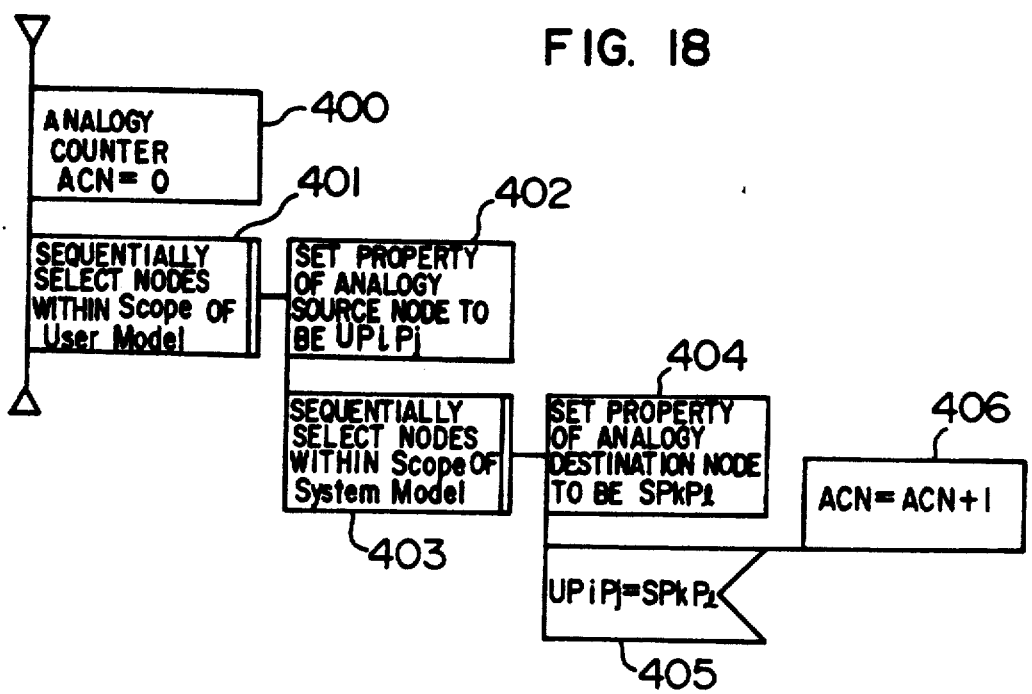
FIG. 18 is a diagram showing a procedure of an operation for determining an analogy between models.

Next, a procedure of an analogy calculation is shown in detail in FIG. 18. First, coincidences between nodes in the "part-of" layer structure scopes are counted to quantitatively evaluate an analogy. For this purpose, an analogy counter ACN is cleared to zero (step 400). Then, all the nodes in the user model scope are sequentially selected as an analogy source node from upside to downside and from left to right of the "part-of" layer structure in the user model scope (step 401). A property of the analogy source node is extracted and the value thereof is set to be UPiPj (step 402). It should be noted in this example that the value i has already been determined in the previous scoping operation for the user model and is fixed in the range of this flowchart.

Next, it is examined whether or not each of the selected source nodes has the analogy to each node in the scope of the system model. Even in this case, an analogy destination node is selected by searching for the "part-of" layer structure scope from upside to downside and from left to right. Then, a property of the selected destination node is extracted and set to be SPkP1 (step 404). This value k has also been determined in the previous scoping operation for the system model. Thus, a coincidence of the property UPiPj of the source node with the property SPkP1 of the destination node is examined after the above-mentioned operation for limiting the analogy source and destination nodes (step 405), and if they coincide with each other, the analogy counter is incremented by a specified value (step 406).

Figure 17:
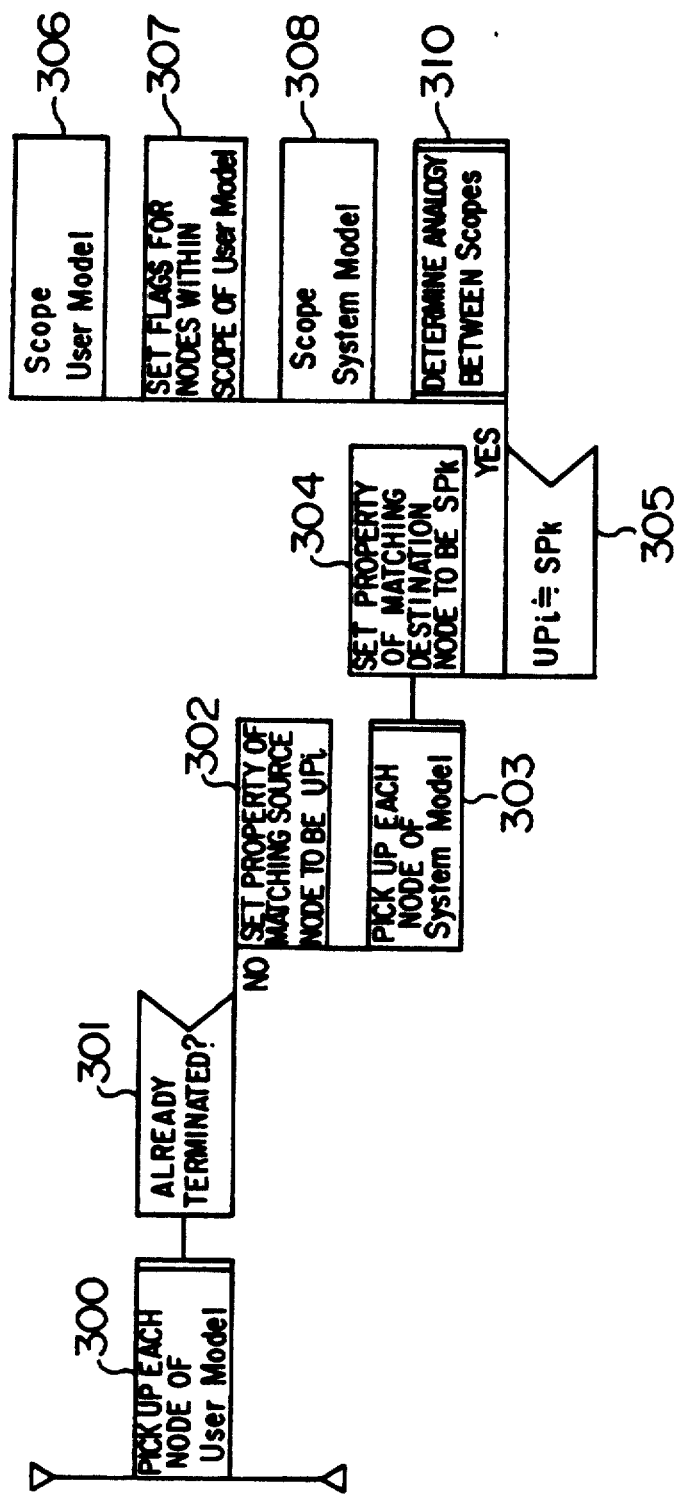
FIG. 17 is a diagram showing a procedure of an operation for an analogy-type structure matching.

When a sequence of operations for nodes in the scopes of the both user and system models are completed, a flag is set to each node in the scope of the user model so as to avoid repetitive matching processing (step 307 of FIG. 17). In addition, positions of the analogy destination nodes and scopes of system models for the analogy destination nodes are sorted in the order of values counted by the analogy counter, and stored in a form of a list. These are referred to as matching candidates in analogy order, and delivered to a structure analogy operation in the next procedure.

Figure 19:
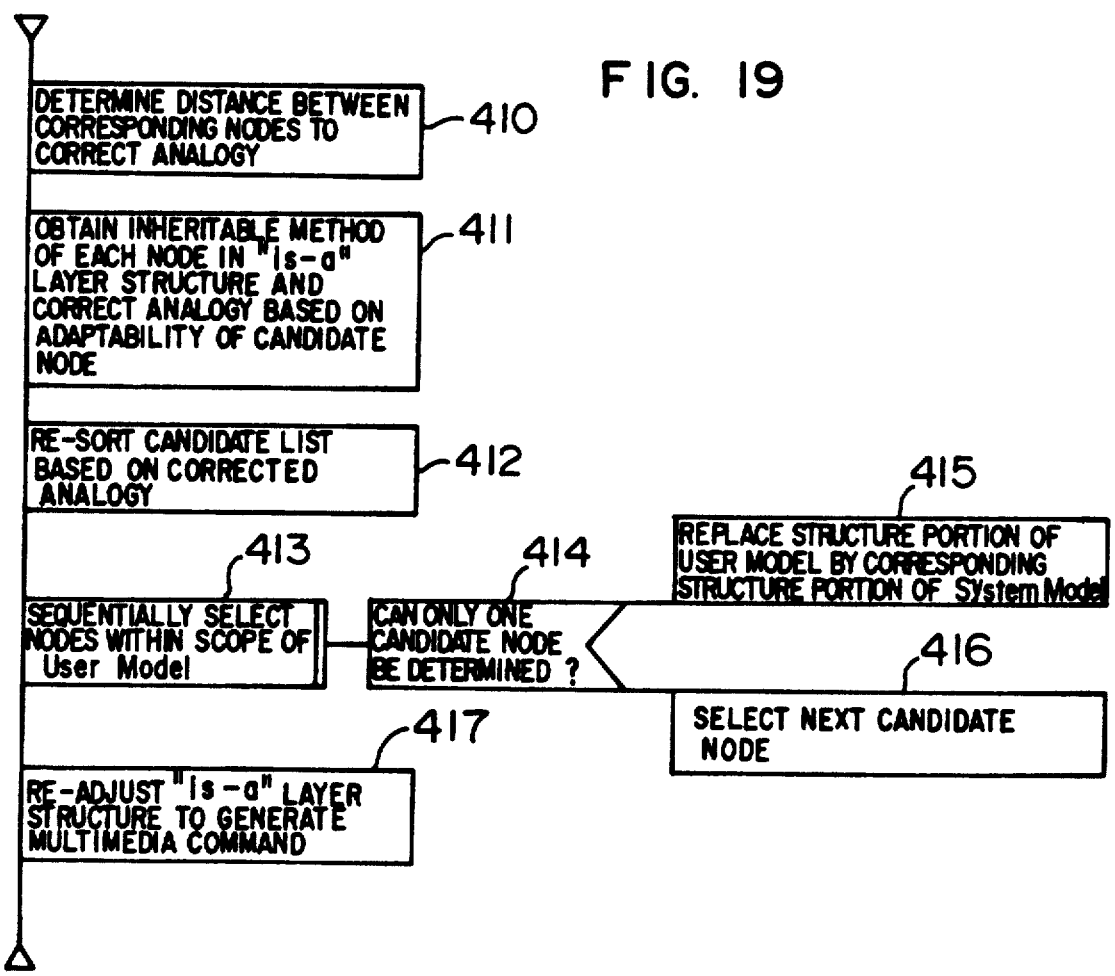
FIG. 19 is a diagram showing a procedure of an operation for generating an execution command.

FIG. 19 shows a procedure of a multimedia command generation operation. First, a distance between corresponding nodes of, particularly, the system model is determined from a relation between the "part-of" layer structure portions of the user model and the system model, and analogy values in the candidate list are corrected based on the distance (step 310). A method of calculating a distance between nodes will be separately explained in detail with reference to FIG. 20.

Next, the "is-a" layer structure is examined for all the nodes existing in the scopes of the respective user model and system model having a corresponding relation with each other. In this event, all inheritable methods are obtained and listed from the "is-a" layer structure. Further, it is examined whether or not each listed method can cover all data elements in the listed method of the user model. If it is impossible to cover them, a predetermined minus value is added to the number of concerned methods and the sum is reflected to the analogy (step 411). Then, the candidate list is sorted again based on the analogy corrected at steps 410, 411 (step 412).

It is determined whether a candidate scope of the system model is uniquely determined for all the scopes in the user model from this candidate list (step 414). This determination is based on whether an absolute value of the analogy is above a predetermined value, and whether the difference is above another predetermined value. If a matching candidate in the scope of the system model is uniquely determined, the scope in the user model is rewritten by using the determined matching candidate (step 415). If it is not uniquely determined, a next candidate is selected, the predetermined values for determination are decreased, and it is examined again whether the selected candidate conforms to the determination base (step 416).

Next, it is determined whether or not each method of each node in the rewritten user model can be inherited in the "is-a" layer structure. If it cannot be inherited, the "is-a" layer structure is adjusted to enable such inheritance (step 417).

Figure 20:
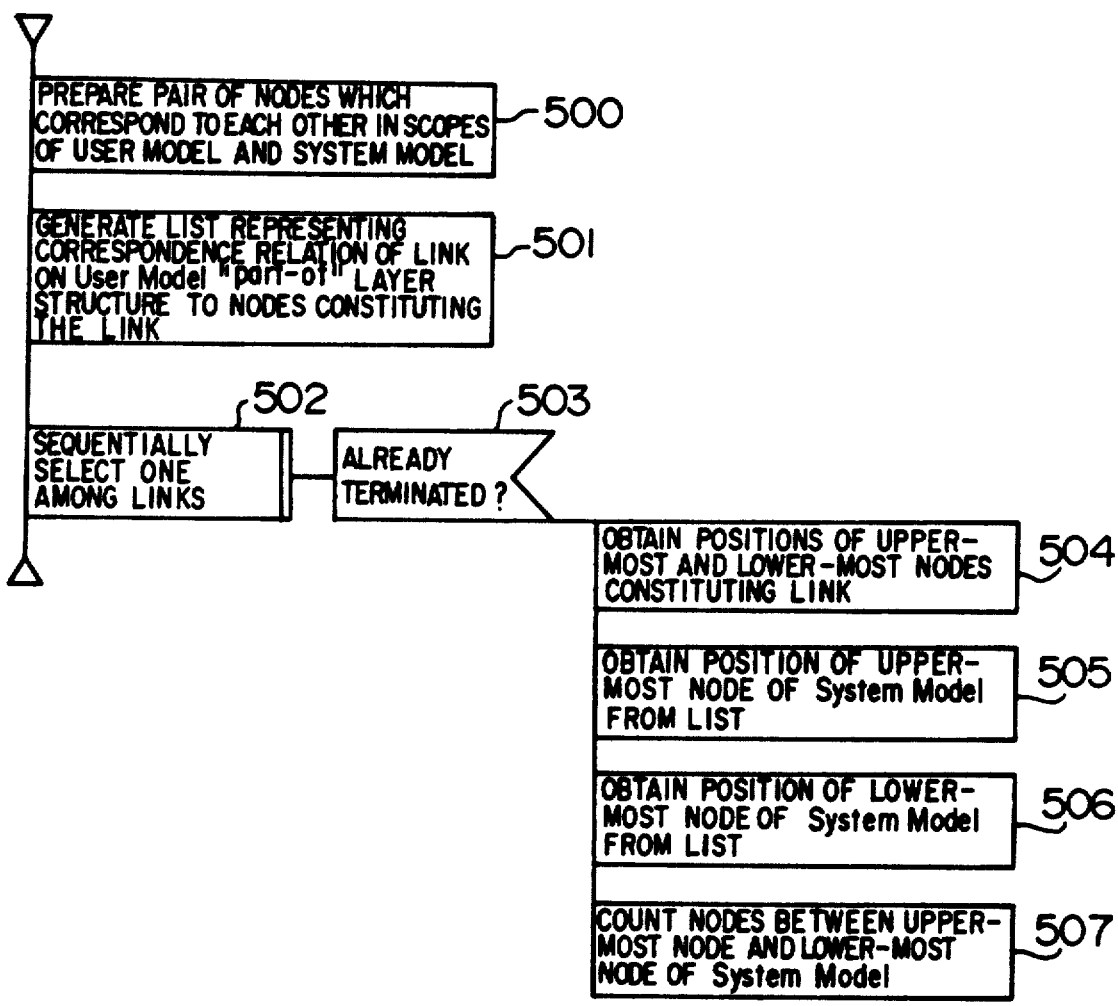
FIG. 20 is a diagram showing a procedure of an operation for calculating a distance between corresponding nodes.

For the above-mentioned procedure of the multimedia command generation operation of FIG. 19, a method of calculating a distance between corresponding nodes, described at step 410, will be explained in detail with reference to FIG. 20. First, corresponding node positions in the user model and the system model are coupled to generate a pair list (step 500). Next, a link-node correspondence list is generated in which a position of a link coupling one and another node in the scope of the user model is related to the positions of the nodes constituting the link (step 501).

Then, the link position is sequentially selected from the entire link-node correspondence list (step 502), and it is determined whether or not the selected link position has already processed (step 503). If it has not yet been processed, the positions of the upper and lower nodes constituting the selected link are examined (step 504). Next, a node position in the system model corresponding to the upper node in the user model is obtained by the use of the pair list (step 505). Likewise, a node position in the system model corresponding to the lower node in the user model is obtained by the use of the pair list (step 506). Finally, the number of nodes in the system model existing between the upper and lower node positions in the user model is counted, and this number is defined as the distance between the corresponding nodes. The above-mentioned analogy calculation employs a reciprocal of the distance such that the analogy is larger as the distance is shorter.

Turning back to FIG. 16, at step 203, paying attention to the "is-a" layer structure in respective objects of the matching candidates inferred at the former step 202, it is determined whether or not an operation using a candidate object leads to a specific result, from an analysis of an inheritance structure of methods and definitions. At step 204, the operation is changed over according to the determination result at step 203. Specifically, if the result shows "N" (No) at step 204, the object to be processed is transferred to a next matching candidate (step 205). Then, the procedure returns to the previous step 203, where an inheritance relation is again examined from the "is-a" layer structure, and it is determined whether or not it is possible to obtain a final result by the operation using the new matching candidate.

On the other hand, if the results shows "Y" (Yes) at step 204, a matched object structure portion is extracted from the whole object structure of the system model and a matched portion of the object structure of the user model is replaced by the extracted portion at step 206. At step 207, the portion replaced by the object structure of the system model and the remaining portion previously existing as the user model are adjusted to be arranged in an executable multimedia command (an execution command object) form as a whole. Finally, at step 208, each method of the execution command object is executed, and the result is arranged in a display form which is transferred to the display section 16 to be displayed as a processed result on a graphic terminal.

As described above, the analogy type structure matching between models according to the present invention enables a processing by using a semantic model extremely proximal to a semantic structure arbitrarily set by the user, which results in improving a processing efficiency of the multimedia as well as greatly improving the quality of the user interface.

What is claimed is:

1. A method of presenting multimedia data in a desired form, comprising the steps of:
   establishing a user model having a plurality of user model structure portions;
   establishing a plurality of system models each having a plurality of system model structure portions;
   determining similarity levels of each user model structure portion of the user model to each system model structure portion of the plurality of system models, said user model being generated in accordance with a request and having a hierarchical semantic structure of the desired form, and said system models having hierarchical semantic structures of multimedia data layered in accordance with a predetermined hierarchy of each element of the multimedia data;
   replacing each user model structure portion by a specific one of the corresponding system model structure portions in accordance with the similarity levels, while adjusting the specific system model structure portion to the user model structure portion in accordance with the similarity level determination; and
   executing the user model modified by the replacing step to present the multimedia data in the desired form.

2. A method according to claim 1, wherein the user model and the system models are modeled in an object structure, and each object structure of the user model and system the models includes a "part-of" structure and an "is-a" structure.

3. A method according to claim 2, further comprising the step of generating, in accordance with the request, the user model from a template model which represents a general schematic structure of the multimedia data.

4. A method according to claim 2, wherein the establishing step establishes the system models from elements of the multimedia data.

5. A method according to claim 2, wherein said step of determining similarity levels comprises the steps of:
sequentially extracting a "part-of" structure portion of the user model while changing a destination node over predetermined nodes in the user model;
examining, when a "part-of" user model structure portion is to be replaced by a "part-of" system model structure portion having a similarity level above a predetermined level, the similarity level determination of the "part-of" system model structure portion with respect to the "part-of" user model structure portion; and
replacing the "part-of" user model structure portion by the "part-of" system model structure portion after adjusting the user model in accordance with the similarity level determination.

6. A method according to claim 5, wherein said extracting step comprises the step of, when a destination node is selected, extracting a user model structure portion having a first layer level difference in a predetermined area with the destination node as the center thereof, and extracting a user model structure portion above a second layer level in the periphery thereof, wherein said second layer level is higher than said first layer level.

7. A method of supplying data analogous to data designated by a request, said method being executed by a computer system and comprising the steps of:
establishing system models each having a hierarchical semantic structure of data layered in accordance with a predetermined hierarchy, each of a plurality of nodes of the hierarchical semantic structure being an object representing the data and a procedure for the data or relation among its lower objects;
generating a specific user model representing a request and having a hierarchical semantic structure of a desired form;
examining an analogy level between each of a plurality of portions of the specific user model and each of a plurality of portions of each system model;
synthesizing portions of the system models which are selected in accordance with the specific user model and the analogy levels to produce an analogous model; and
executing the analogous model to represent the data in the desired form.

8. A method according to claim 7, wherein said generating step comprises the steps of:
selecting a user model from a plurality of user models in accordance with a kind of the request; and
determining the semantic structure of the selected user model in accordance with details of the request to generate the specific user model.

9. A method according to claim 7, wherein said examining step comprises the step of:
repeatedly examining an analogy level between a portion of the specific user model and a portion of each system model
while defining a scope for the portion of the specific user model and for the portion of each system model, and
while changing the portion of the specific user model and the portion of each system model.

10. A method according to claim 7, wherein said synthesizing step comprises the step of replacing each portion of the specific user model by portions of the system models which are selected in accordance with the analogy levels.

* * * * *